(12) United States Patent
Ishizaki et al.

(10) Patent No.: US 8,650,360 B2
(45) Date of Patent: *Feb. 11, 2014

(54) STORAGE SYSTEM

(71) Applicants: Taro Ishizaki, Odawara (JP);
Katsuyoshi Suzuki, Odawara (JP)

(72) Inventors: Taro Ishizaki, Odawara (JP);
Katsuyoshi Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,672

(22) Filed: May 20, 2013

(65) Prior Publication Data
US 2013/0254482 A1    Sep. 26, 2013

Related U.S. Application Data

(63) Continuation of application No. 12/670,498, filed as application No. PCT/JP2010/000166 on Jan. 14, 2010, now Pat. No. 8,468,302.

(51) Int. Cl.
*G06F 12/00*    (2006.01)

(52) U.S. Cl.
USPC .................. 711/114; 711/165; 711/E12.095

(58) Field of Classification Search
USPC ................................................ 711/114, 165
See application file for complete search history.

(56) References Cited

U.S. PATENT DOCUMENTS

| 8,099,623 | B1 | 1/2012 | Li et al. |
| 2003/0131182 | A1 | 7/2003 | Kumar et al. |
| 2005/0102551 | A1 | 5/2005 | Watanabe |
| 2008/0235448 | A1 | 9/2008 | Inoue et al. |
| 2008/0275928 | A1 | 11/2008 | Shuster |
| 2009/0240882 | A1 | 9/2009 | Shiga et al. |
| 2010/0107003 | A1 | 4/2010 | Kawaguchi |
| 2010/0138624 | A1 | 6/2010 | Seki et al. |
| 2010/0235573 | A1 | 9/2010 | Asano et al. |

FOREIGN PATENT DOCUMENTS

| JP | 2006-505831 A | 2/2006 |
| JP | 2008-146574 A | 6/2008 |
| JP | 2008-234158 | 10/2008 |
| JP | 2009-230352 | 10/2009 |
| WO | 03/077111 A1 | 9/2003 |
| WO | 2005-017737 | 2/2005 |

OTHER PUBLICATIONS

N. Joukov et al., Increasing Distributed Storage Survivability with a Stackable RAID-like File System, IEEE, May 9, 2005, 8 pp., USA.
N. Joukov et al., RAIF: Redundant Array of Independent Filesystems, IEEE, Sep. 1, 2007, 14 pp., USA.

*Primary Examiner* — Reginald Bragdon
*Assistant Examiner* — Hamdy S Ahmed
(74) *Attorney, Agent, or Firm* — Mattingly & Malur, PC

(57) ABSTRACT

With a RAID group not configured from a plurality of storage devices, a storage area of a storage device is provided directly to a virtual volume instead of providing a logical volume inside the RAID group to the virtual volume. That is, the storage system, upon receiving a write request with respect to a virtual storage area, first, specifies a data redundancy configuration (the number of data partitions and the number of created parities) and a RAID level set to a virtual volume including this virtual storage area. The storage system selects storage devices in the numbers in accordance with the specified RAID level and redundancy configuration for this virtual storage area. The storage system selects, from among the selected storage devices, a storage area that is not allocated to any virtual storage area, and allocates this storage area to this virtual storage area. The storage system partitions the data and writes this data together with the parity to this allocated storage area.

14 Claims, 28 Drawing Sheets

FIG.7

| POOL NO. 210 | PDEV NO. LIST 211 | REAL ALLOCATION CAPACITY 212 | UTILIZATION CAPACITY 213 | FIRST PDEV NO. 214 |
|---|---|---|---|---|
| 01 | 01, 02, 03 | 2TB | 0MB | 01 |
| 02 | 04, 05, 06, 07 | 3TB | 100MB | 06 |
| ... | ... | ... | ... | ... |

| LUN | ASSIGNED POOL NO. | RAID LEVEL | COMBINATION | CAPACITY |
|---|---|---|---|---|
| 01 | 01 | RAID5 | 2D+1P | 1TB |
| 02 | 02 | RAID6 | 3D+2P | 2TB |
| ... | ... | ... | ... | ... |

| PDEV NO. | ASSIGNED POOL NO. | IF TYPE | PDEV PERFORMANCE | CAPACITY | FREE CAPACITY | DEVICE TYPE |
|---|---|---|---|---|---|---|
| 01 | 01 | SAS | 7,200rpm | 500GB | 200GB | HDD |
| 02 | 01 | SAS | 7,200rpm | 500GB | 300GB | HDD |
| 03 | null | SATA | 7,200rpm | 500GB | 500GB | HDD |
| ... | ... | ... | ... | ... | ... | ... |

| PDEV NO. 240 | REAL PAGE NO. 241 | LUN 242 | VIRTUAL PAGE NO. 243 | ACCESS COUNTER 244 |
|---|---|---|---|---|
| 01 | R11 | 01 | V11 | 5 |
| 01 | R12 | null | null | 0 |
| ... | ... | ... | ... | ... |

| LUN 250 | VIRTUAL PAGE NO. 251 | REAL PAGE IDENTIFICATION INFORMATION 252 | ACCESS COUNTER 253 |
|---|---|---|---|
| 01 | V11 | {01, R11}, {02, R22}, ... | 5 |
| 01 | V12 | null | 0 |
| ... | ... | ... | ... |

STORAGE SYSTEM

This is a continuation of U.S. Ser. No. 12/670,498, filed Jan. 25, 2010 which is a 371 National Stage of PCT/JP2010/000166, filed on Jan. 14, 2010. The entire disclosures of all these applications are hereby incorporated by reference.

TECHNICAL FIELD

The present invention relates to storage control to which Dynamic Provisioning (also called Thin Provisioning) is applied.

BACKGROUND ART

Storage systems configured from RAID (Redundant Array of Independent (or Inexpensive) Disks) are being used widely today to safely store corporate data. In addition, thin provisioning is being introduced to enhance the utilization efficiency of storage system capacity.

In a RAID system, a RAID group is configured from a plurality of storage devices, and a logical volume is configured on the RAID group. In a storage system that does not use thin provisioning, the logical volume is provided to a host, and a storage area of a storage device having a capacity that is equivalent to the entire storage capacity of the logical volume is allocated to this logical volume from the time the logical volume is created. By contrast, in thin provisioning, in which a virtual volume is provided to the host, a storage area of the storage device corresponding to the initial virtual storage area is not allocated to the virtual storage area inside this virtual volume, but rather, the storage area of the storage device that is allocated to the logical volume is allocated only to the virtual storage area when there has been a write request with respect to the virtual storage area. For this reason, only a storage device of the capacity required for the time being is provided when the storage system is introduced, and a storage device can easily be added as the need arises.

As a thin provisioning technique, Patent Literature 1 proposes a method for rearranging data on a plurality of storage devices in logical volume units in a storage system that uses thin provisioning.

Further, Patent Literature 2 proposes a method for adding storage devices in storage device units by changing the data redundancy configuration after adding a storage device.

CITATION LIST

Patent Literature

[PTL (Patent Literature) 1]
Japanese Patent Application Laid-open No. 2008-234158
[PTL 2]
Japanese Patent Application Laid-open No. 2009-230352

SUMMARY OF INVENTION

Technical Problem

In the above-mentioned Patent Literature 1, a RAID group is configured from a plurality of storage devices prior to these storage devices being allocated to the virtual volume, and data management is carried out in logical volume units inside the RAID group. For example, data redundancy is maintained by storing the data that is inside the logical volume so as to extend across a plurality of storage devices of this RAID group. For this reason, storage device addition must be carried out by adding a plurality of storage devices during a single addition to achieve a group of storage devices in the numbers required to configure a RAID group.

In the above-mentioned Patent Literature 2 method, the premise is that a RAID group is configured from a plurality of storage devices prior to these storage devices being allocated to the virtual volume the same as in the above-mentioned Patent Literature 1, and that a logical volume in this RAID group is provided to the virtual volume. In so doing, the RAID group must be reconfigured after adding a single storage device, giving rise to the need to reorganize the data redundancy configuration.

An object of the present invention is to provide a method for enhancing the flexibility and lowering the cost of storage device addition in a storage system that makes use of thin provisioning.

An object of the present invention is to suppress the influence, which is exerted by the addition of storage devices, on business or other operations in a storage system to which the thin provisioning is employed.

In addition, another object of the present invention is to provide a storage system that does not require a spare disk, i.e., a specific storage device provided in preparation for a storage device failure.

Solution to Problem

In a storage system having a thin provisioning function, with a RAID group being configured from a plurality of storage devices, a storage area of a storage device is provided directly to a virtual volume instead of providing a logical volume inside the RAID group to the virtual volume. That is, the storage system, upon receiving a write request with respect to a virtual storage area, first of all, specifies the data redundancy configuration (a number of data partitions and a number of created parities) and the RAID level set to the virtual volume comprising this virtual storage area. The storage system selects a number of storage devices in accordance with the specified RAID level and redundancy configuration for this virtual storage area. The storage system selects, from among the selected storage devices, a storage area that is not allocated to a virtual storage area, and allocates this storage area to this virtual storage area. The storage system partitions the data and writes this data together with the parity to this allocated storage area.

Advantageous Effects of Invention

According to an embodiment of the present invention, it is possible to expand storage capacity while holding the cost of storage device addition to the minimum.

BRIEF DESCRIPTION OF DRAWINGS

FIG. 7 shows the configuration of a pool management table 505.

FIG. 8 shows the configuration of a virtual LU management table 507.

FIG. 9 shows the configuration of a PDEV management table 509.

FIG. 10 shows the configuration of a real page management table 511.

FIG. 11 shows the configuration of a mapping management table 513.

DESCRIPTION OF EMBODIMENT

Figure 1:
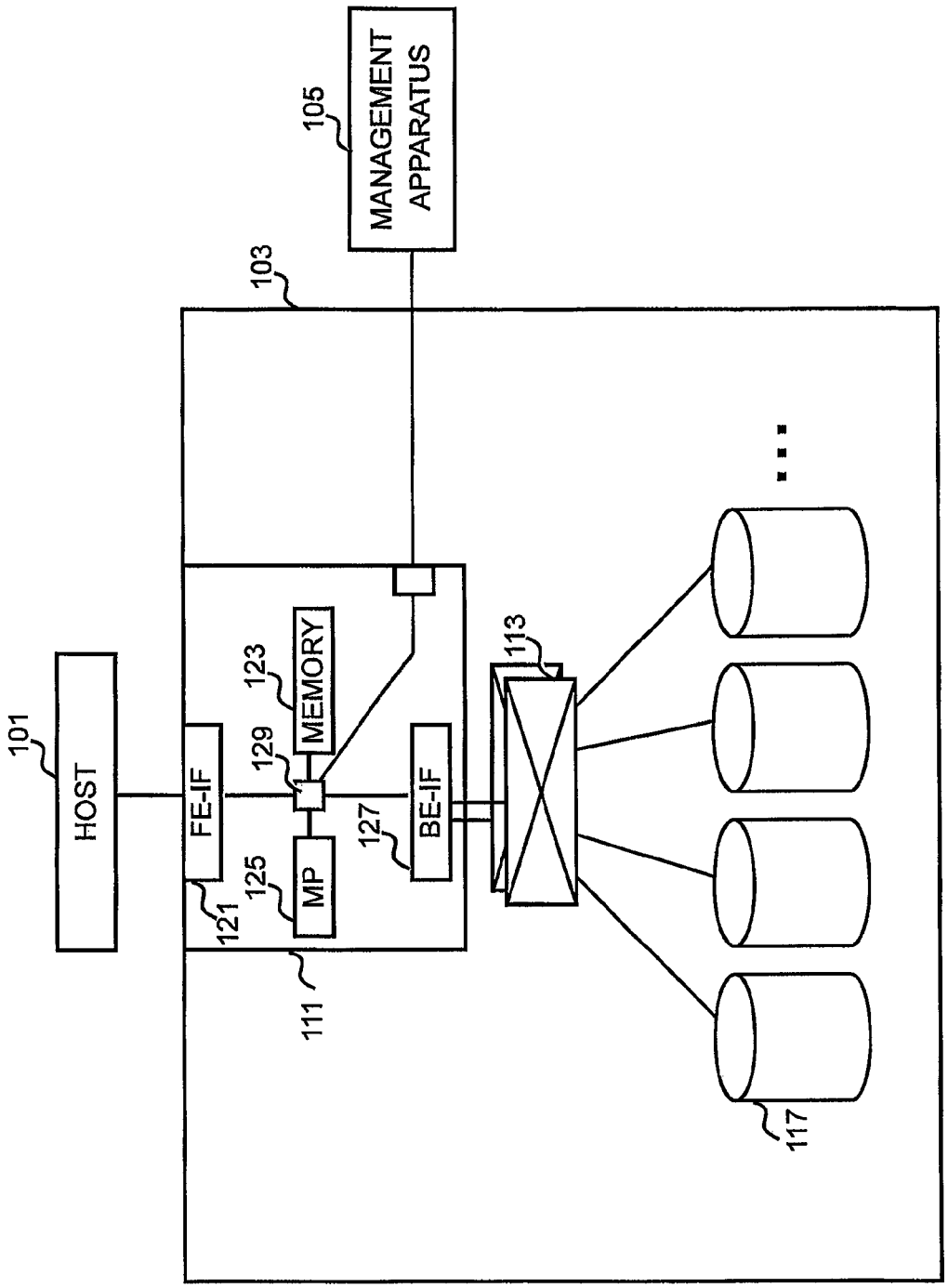
FIG. 1 shows the configuration of a storage system related to an embodiment of the present invention.

FIG. 1 is shows the configuration of a storage system related to an embodiment of the present invention.

One or more (for example, two) host apparatuses (hereinafter, host) 101 are coupled to the storage system 103. Communication between the host 101 and the storage system 103, for example, is carried out using a protocol that conforms to either a Fibre Channel (FC) or an iSCSI (SCSI is the abbreviation for Small Computer System Interface).

The storage system 103 manages a virtual LU (LU is the abbreviation for a Logical Unit). The virtual LU is a virtual LU that conforms to Dynamic Provisioning (also called Thin Provisioning) technology. The virtual LU comprises a plurality of virtual pages (virtual storage areas). One or more addresses (for example, a LBA (Logical Block Address) belong to each virtual page.

The host 101 sends an I/O command for carrying out I/O (Input/Output) with respect to the virtual LU. The I/O command comprises I/O destination information. The I/O destination information includes the LUN (Logical Unit Number) of a virtual LU and the virtual page address of the virtual LU. The host 101 is generally a computer, but another storage system may be used instead of a computer.

The storage system 103 comprises a plurality of physical storage devices (PDEV) 117, and a storage control apparatus (hereinafter referred to as "DKC") 111 that is coupled to the plurality of PDEV 117. The DKC 111 is multiplexed (for example, duplexed). The plurality of PDEV 117 may be configured from the same type of PDEV, or may be a mixture of a plurality of types of PDEV. As types of PDEV, for example, there are a HDD (Hard Disk Drive) and a SSD (Solid State Drive).

The DKC 111 receives and processes an I/O command (either a write command or a read command) from the host 101. The DKC, upon receiving a write command, for example, allocates a plurality of real pages (substantial storage areas) to each of one or more write-destination virtual pages specified in the received write command. For the sake of convenience, the allocation of a real page to a virtual page will be called "dynamic capacity expansion".

A plurality of PDEV 117 are coupled to the DKC 111 via one or more backend coupling devices 113. The backend coupling devices 113 are multiplexed (for example, duplexed). As a backend coupling device 113, for example, a FC-AL (Fibre Channel-Arbitrated Loop) or a SAS (Serial Attached SCSI) expander may be used. One backend coupling device 113 is coupled to two or more PDEV 117 of a plurality of PDEV 117.

A management apparatus 105 is coupled to at the least one DKC 111. The management apparatus 105, for example, is coupled to the at the least one DKC 111 via a LAN (Local Area Network). The management apparatus 105, for example, may be a computer and may carry out various types of settings and references with respect to a LU.

Each DKC 111 comprises a FE-IF (front-end interface) 121, a BE-IF (backend interface) 127, and a controller. The controller, for example, comprises a transfer circuit 129, a memory 123, and an MP (a microprocessor) 125. In addition to these elements, for example, the controller may comprise a hardware circuit for creating parity instead of the MP 125.

The FE-IF 121, the memory 123, the MP 125, and the BE-IF 127 are coupled to the transfer circuit 129. The transfer circuit 129 relays data and a command exchanged among these elements 121, 123, 125, and 127.

The FE-IF 121 is an interface device that is coupled to the host 101. The FE-IF 121 comprises a plurality of communication ports, and a host computer 101 is coupled to each communication port. The FE-IF receives an I/O command from the host 101 and transfers the received I/O command to the MP 125.

The BE-IF 127 is an interface device that is coupled to the PDEV 117. The BE-IF 127 comprises a plurality of communication ports, and a PDEV 117 is coupled to each communication port via the backend coupling device 113.

The memory 123 is configured from one or more memories. The memory 123 stores information (for example, tables) and a computer program. The memory 123 comprises a cache area. Data that is exchanged between the host 101 and the PDEV 117 is temporarily stored in the cache area.

The MP 125 processes an I/O command from the host 101. Further, in response to a request from the management apparatus 105, the MP 125 also sets information (for example, LU-related information) in the memory 123 and provides the information (for example, LU-related information) stored in the memory 123 to the management apparatus 105.

Figure 2:
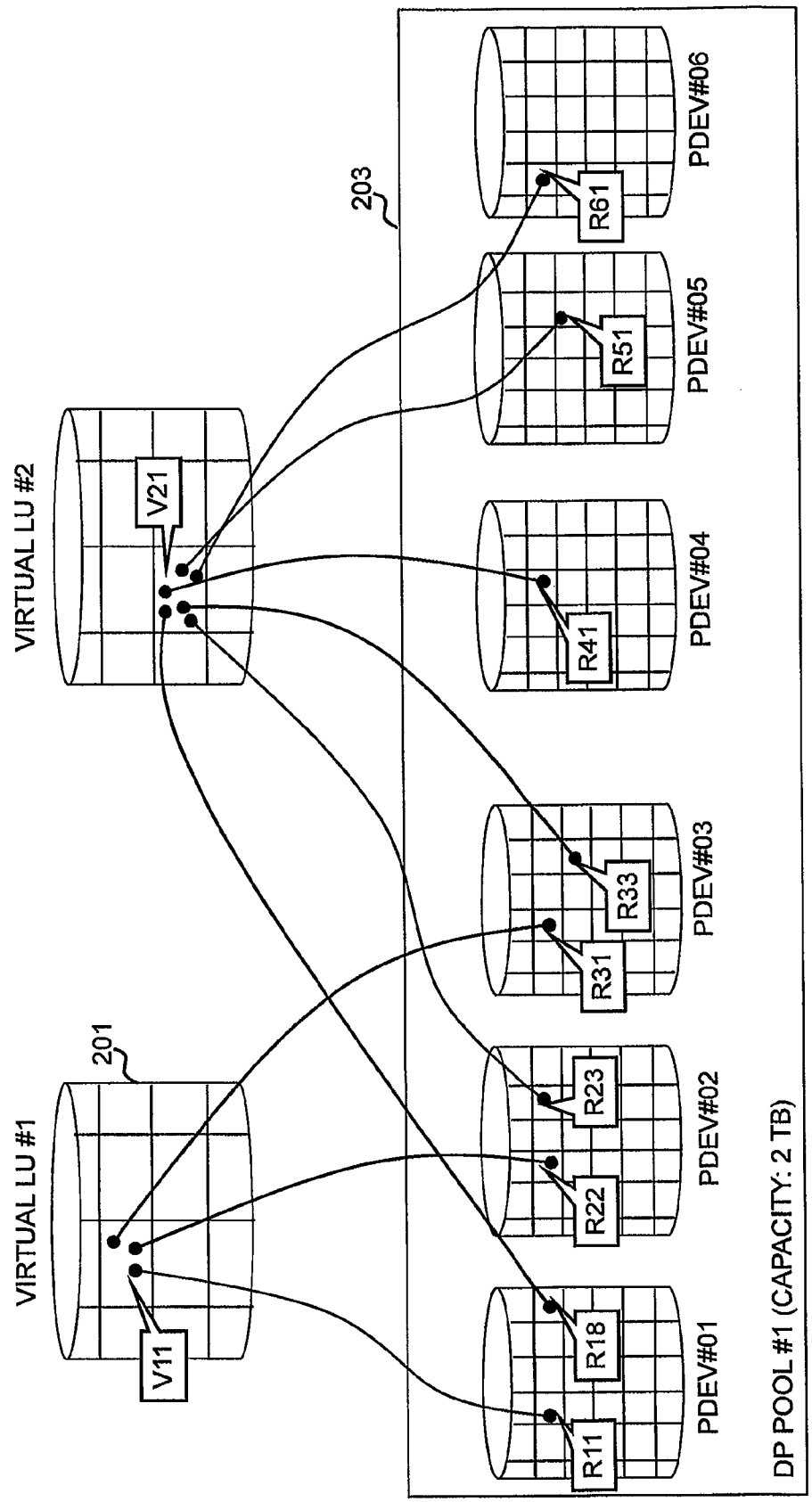
FIG. 2 shows an overview of dynamic capacity expansion related to this embodiment.

FIG. 2 shows an overview of dynamic capacity expansion related to this embodiment.

A virtual LU 201 and a DP (Dynamic Provisioning) pool 203 are managed by the DKC 111. The virtual LU 201 is associated with one DP pool 203, and a real page is allocated from the DP pool 203 to this virtual LU 201.

The virtual LU 201 is configured from a plurality of virtual pages, and is recognized by the host 101. A RAID level is defined for the virtual LU 201. The combination, the RAID level and capacity of the virtual LU 201, for example, can be set from the management apparatus 105 (refer to FIG. 1). The RAID level here is obtained by classifying the RAID technology in accordance with the function thereof, and is expressed as RAID 5 and RAID 6. For example, in RAID 5, data for which there is a write request is partitioned into n parts (n being a natural number), one parity data is created from this data, and this partitioned data and parity are distributively written to (n+1) storage devices. Further, in RAID 6, two types of parity data are created with respect to the partitioned n pieces of data, and this partitioned data and parity are distributively written to (n+2) storage devices. Further, a combination is a combination of the partition number n of the data elements arbitrarily determined for configuring the RAID, and the number m (m being an integer of greater than 0) of parity determined by the RAID level, and is expressed as nD+mP (or D). That is, the data written to a virtual page is partitioned into n data elements, m parity is created, and these partitioned data elements and corresponding parity are distributively written to (n+m) storage devices.

The DP pool 203 is configured from either a portion or all of the PDEV 117 of the plurality of PDEV 117 of the storage system 103. The DP pool 203 is configured from a large number of real pages.

As one characteristic feature of this embodiment, the DP pool 203 may lack a RAID definition, and a real page may be provided from individual PDEV rather than from a RAID group configured from a plurality of PDEV.

Generally speaking, according to the Dynamic Provisioning (Thin Provisioning) technology, a real page allocated to a virtual LU is formed on the basis of a predefined RAID group storage space. Specifically, for example, the pool is configured from either one or a plurality of RAID groups. Each RAID group is configured from two or more PDEV on the basis of the RAID level. A real page is configured on the basis of one RAID group, and one real page extends over two or more PDEV that configure a RAID group. For this reason, in a write to a real page that is allocated to a virtual page, the write-targeted data is written on the basis of the RAID level and combination of the RAID group that provides this real page.

By contrast, according to this embodiment, there is no RAID group definition, and the individual PDEV 117 that configure the DP pool 203 are not RAID group-configuring members. A real page is provided from an individual PDEV. Further, the RAID level and combination are set for the virtual LU 201. A number of real pages determined on the basis of the RAID level and combination of this virtual LU 201 is allocated from the DP pool 203 to a virtual page of the virtual LU 201, and write-targeted data with respect to this virtual page is written to the allocated plurality of real pages.

According to RAID technology, two or more data elements (or write-targeted data and a replicate of this data) from among a plurality of data elements that configure the write-targeted data are not stored in a single PDEV 117. For this reason, in this embodiment, two or more real pages from a single PDEV 117 will not be allocated to the same virtual page. That is, real pages from respectively different PDEV 117 are allocated to a single virtual page. Therefore, it is preferable that a plurality of real pages be allocated to a virtual page so that the utilization rate of a plurality of PDEV belonging to a DP pool (the ratio of the total capacity of the allocated real pages with respect to the capacity of the PDEV) becomes uniform. For example, this is because a plurality of real pages are not able to be allocated from a single PDEV to a single virtual page even when there are lots of free real pages in this one PDEV, thereby making it likely that there will be an excess of free real pages as a result. Further, in this case, the plurality of real pages may be allocated to a virtual page so that not the utilization rate of the plurality of PDEV but free capacity of a plurality of PDEV becomes uniform.

There may be either one or a plurality of the virtual LU 201 and the DP pool 203. According to the example of FIG. 2, it is supposed that there are two virtual LU #1 and #2 as the virtual LU 201, there is one DP pool #1 as the DP pool 203, and the virtual LU #1 and #2 are associated with the DP pool #1. It is also supposed that the RAID level and combination of the virtual LU #1 is RAID 5 (2D+1P), and that the RAID level and combination of the virtual LU #2 is RAID 6 (4D+2P). Further, it is supposed that the DP pool #1 is configured from six PDEV #01 through #06.

RAID level and combination of virtual LU #1: According to RAID 5 (2D+1P), data that is targeted for a write to virtual page V11 of the virtual LU #1 is divided into two data elements by the DKC 111, and, in addition, one parity is created. For this reason, three real pages R11, R22, and R31 are allocated to the virtual page V11 from the three PDEV #01 through #03. The corresponding relationship between the virtual page V11 and the real pages R11, R22, and R31 is managed by the DKC 111. Then, two data elements are respectively written to two of the three real pages R11, R22, and R31, and a parity is written to the remaining one real page.

RAID level and combination of virtual LU #2: According to RAID 6 (4D+2P), data that is targeted for a write to virtual page V21 of the virtual LU #2 is divided into four data elements, and, in addition, two parities are created. For this reason, six real pages R18, R23, R33, R41, R51, and R61 are allocated to the virtual page V21 from the six PDEV #01 through #06. The corresponding relationship between the virtual page V21 and the real pages R18, R23, R33, R41, R51, and R61 is managed by the DKC 111. Then, four data elements are respectively written to four of the six real pages R18, R23, R33, R41, R51, and R61, and two parities are written to the remaining two real page.

One DP pool 203 may be configured by one or more physical storage devices (PDEV) having the same attributes, and may also be configured by PDEV having different attributes. Attributes, for example, may include the I/O performance or reliability (for example, the MTBF (Mean Time Between Failures)) of the PDEV. The I/O performance of the PDEV, for example, may include the type of the PDEV itself (for example, HDD, SSD, and so forth), the type of interface (for example, an FC (Fibre Channel), a SATA (Serial ATA), an SAS (Serial Attached SCSI), and the rotational speed of the disk.

Figure 3:
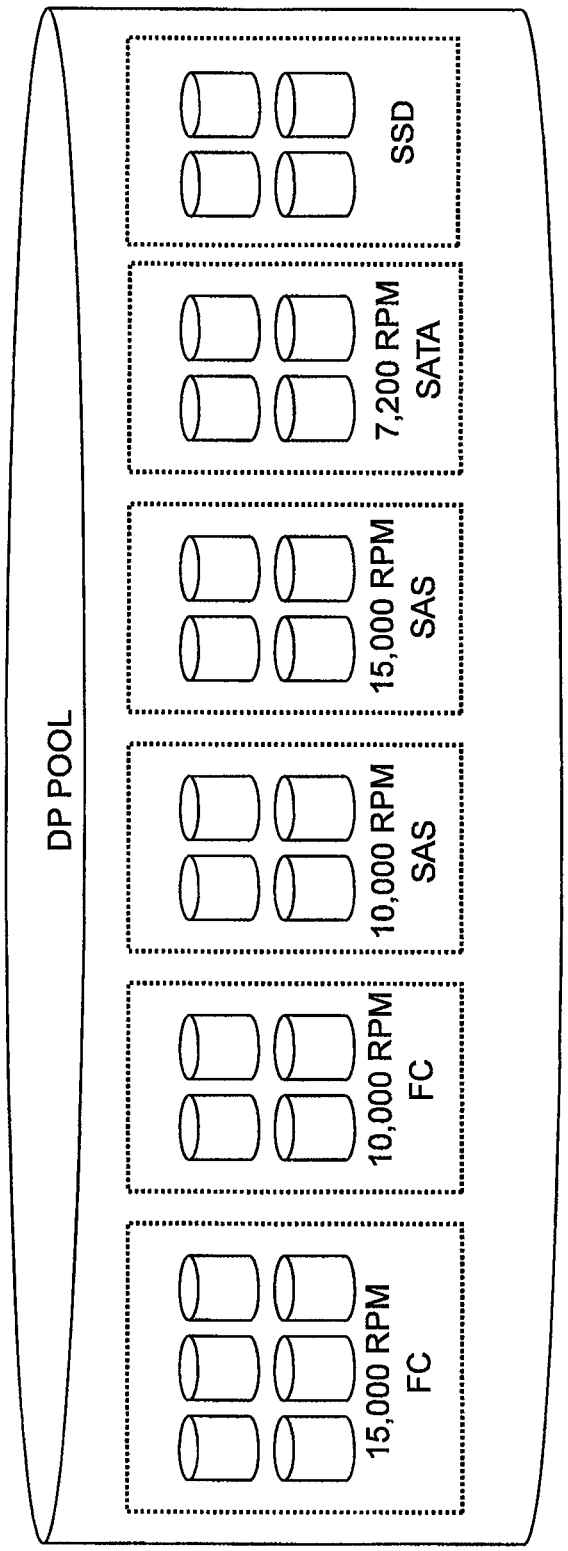
FIG. 3 shows an example of a first configuration of a DP pool.

As shown in FIG. 3, a single DP pool 203 may be configured from PDEV (in the example of FIG. 3, HDD and SSD) having different types of attributes. In a case where a virtual page is configured from a plurality of real pages having different attributes, performance drops to the level of the PDEV with the lowest I/O performance when writing or reading data to or from the respective PDEV, making it preferable that each virtual page be configured from PDEV having the same attribute. However, respective virtual LU are assigned to one pool. For this reason, the mixing together of PDEV with different attributes inside the same pool makes it possible to allocate real pages inside PDEV with different attributes to each virtual page of the same virtual LU. Further, even in a case where real pages from PDEV having the same attribute are allocated to the same virtual page, it is possible to allocate real pages from PDEV having different attributes when the capacity of a PDEV of a certain attribute becomes insufficient. After adding a PDEV with this capacity storage attribute, it is possible to allocate to the added PDEV data elements allocated to PDEV with different attributes. A DP pool 203 of this type of configuration makes it possible to efficiently use disk capacity.

Figure 4:
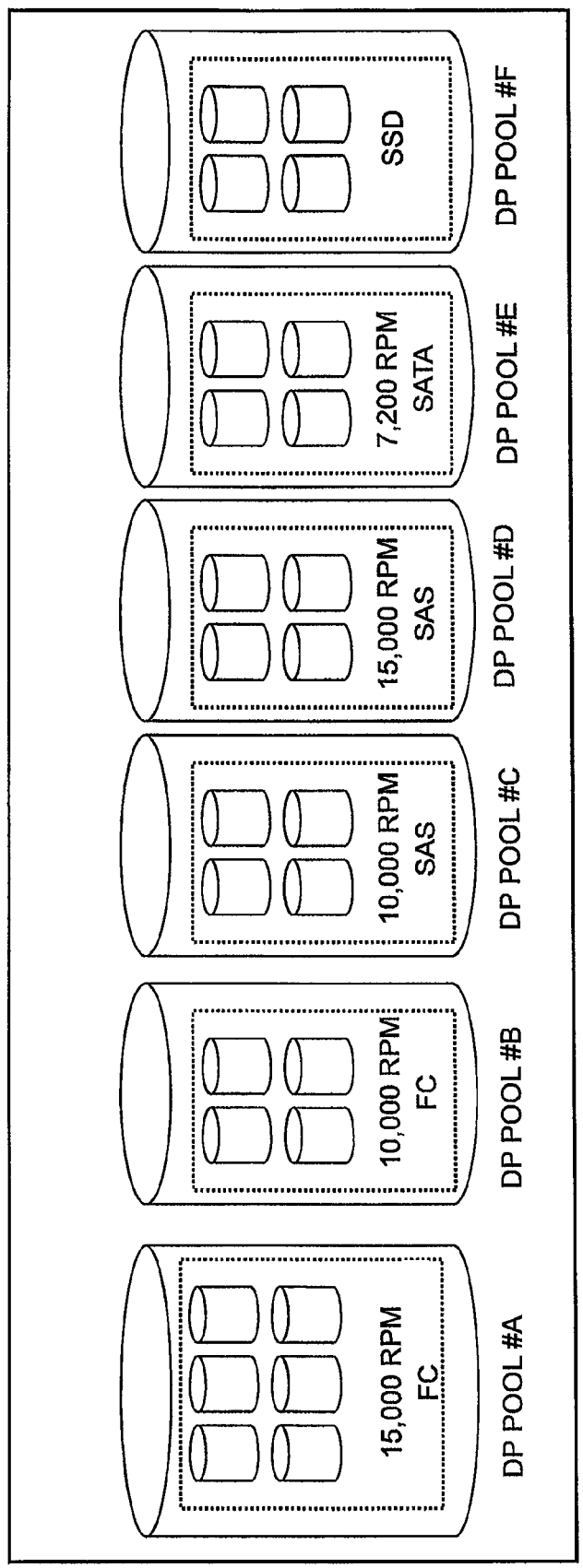
FIG. 4 shows an example of a second configuration of the DP pool.

Further, as shown in FIG. 4, one or more prescribed types of attributes of a plurality of attributes may be configured in the same PDEV of one DP pool 203. According to the example of FIG. 4, a single DP pool 203 is configured from PDEV for which the PDEV performance, the PDEV interface and the type of the PDEV itself are all the same. According to a DP pool 203 of this type configuration, it is possible to anticipate a desired I/O performance with respect to accessing the virtual LU 201. For example, in a case where it is preferable to improve the I/O performance of a virtual LU that is associated with the DP Pool #E, this virtual LU may be associated with a DP pool (for example, DP pool #D) configured from PDEV having improved I/O performance than the PDEV that configure the DP pool #E. Furthermore, in a case where the DP pool with which the virtual LU is associated is changed to a different DP pool, the data elements and parity are migrated from the pre-change DP pool to the post-change DP pool.

Information related to the DP pool 203 and information denoting the corresponding relationship between a virtual page and a plurality of real pages is managed by the DKC 111. This information, for example, is stored in the memory 123 (for example, the cache area) of the DKC 111.

Figure 5:
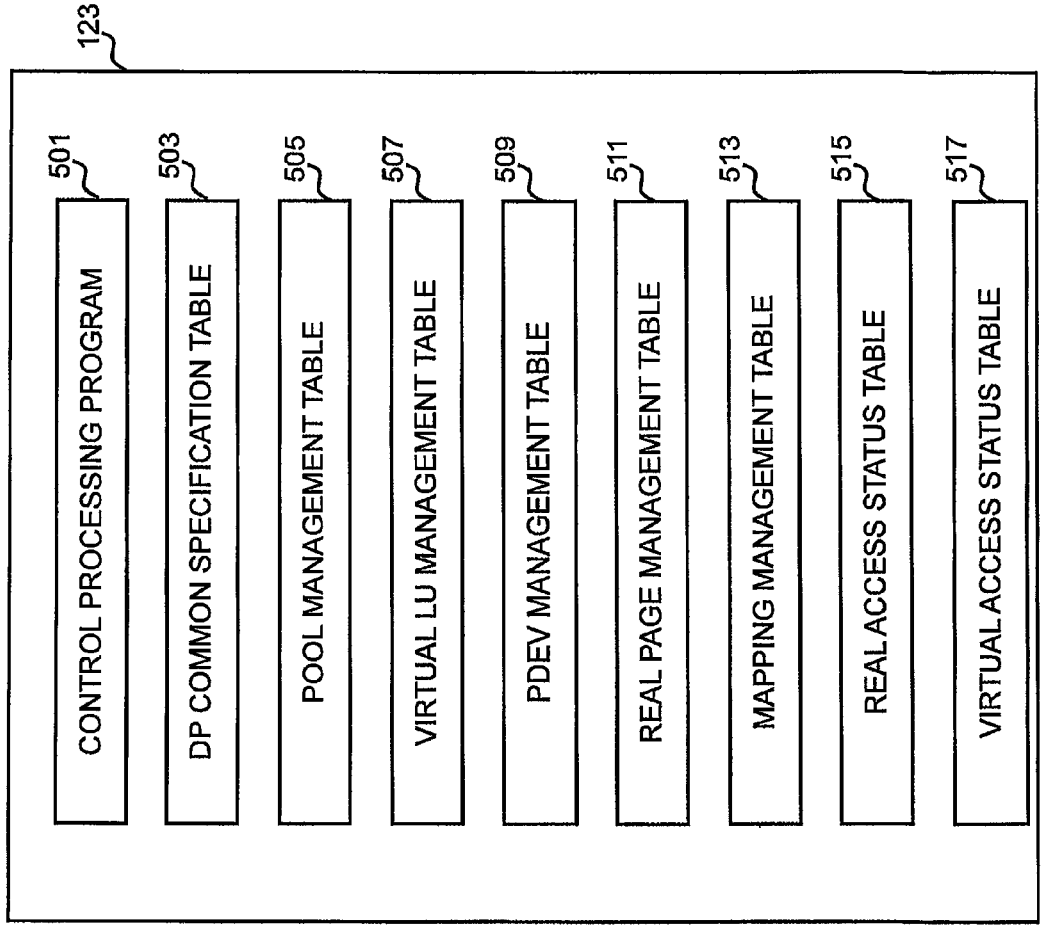
FIG. 5 shows a computer program and information stored in a memory 123.

FIG. 5 shows the computer program and information stored in the memory 123.

The memory 123 stores a control processing program 501. The control processing program 501 is executed by the MP 125. In the following explanation, processing that is carried out by the program 501 is actually performed by the MP 125.

The memory 123 stores a DP common specification table 503, a pool management table 505, a virtual LU management table 507, a PDEV management table 509, a real page management table 511, a mapping management table 513, a real access status table 515, and a virtual access status table 517. The real page management table 511 exists in each DP pool 203. The information in at least one of these tables may be managed in a structure other than a table.

Figure 6:
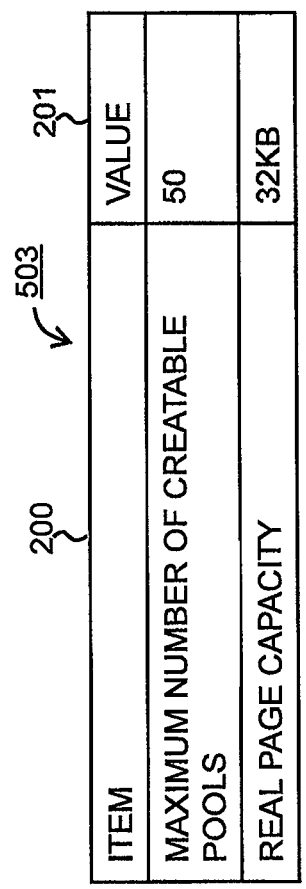
FIG. 6 shows the configuration of a DP common specification table 503.

FIG. 6 shows the configuration of the DP common specification table 503.

The DP common specification table 503 comprises common information related to the specification of the DP pool. Specifically, for example, the table 503 comprises an item 200 and a value 201 for each item related to the DP pool specification. The item 200 is the name of an item, and the value 201 is the value for this item. According to the example of FIG. 6, the maximum number of creatable pools (the maximum number of DP pools 203 capable of being created in the storage system 103) is 50, and the real page capacity is 32 KB (kilobytes).

Furthermore, in this embodiment, the real page capacity is the same in all of the DP pools. For this reason, the capacity of a virtual page that configures the virtual LU 201 is determined on the basis of the real page capacity, RAID level and combination. When the combination is nD+mP, it is possible to store in the virtual page data of n-times the capacity of the real page, and (n+m) times the capacity is allocated. For example, the capacity of a virtual page of a RAID 6 (4D+2P) virtual LU 201 is twice the capacity of a virtual page of a RAID 5 (2D+1P) virtual LU 201. As explained hereinabove, this is because the real page capacity is the same, and the number of real pages allocated to a virtual page of a RAID 6 (4D+2P) virtual LU 201 is twice the number of real pages that is allocated to a virtual page of a RAID 5 (2D+1P) virtual LU 201. Specifically, six real pages are allocated to the virtual page of the RAID 6 (4D+2P) virtual LU 201, and three real pages are allocated to the virtual page of the RAID 5 (2D+1P) virtual LU 201.

FIG. 7 shows the configuration of the pool management table 505.

The pool management table 505 comprises information related to the DP pool 203. Specifically, for example, the table 505 comprises a pool number 210, a PDEV number list 211, a real allocation capacity 212, a utilization capacity 213, and a first PDEV number 214 for each DP pool 203.

The pool number 210 is the number of the DP pool 203.

The PDEV number list 211 is a list of numbers of the PDEV that configure the DP pool 203.

The real allocation capacity 212 is the total capacity of the PDEV that configure the DP pool 203. Therefore, in a case where a new PDEV is added to the DP pool 203, the real allocation capacity 212 will increase in proportion to the capacity of the added PDEV. By contrast, in a case where a PDEV is removed from the DP pool 203, the real allocation capacity 212 will decrease in proportion to the capacity of the removed PDEV.

The utilization capacity 213 is the total capacity of a real page that has been allocated from the DP pool 203.

The first PDEV number 214 is the number of the PDEV that is the next allocation source of a real page. For example, in this embodiment, the two or more PDEV that provide two or more real pages that are allocated to a virtual page are in PDEV number order. Specifically, for example, in a case where the DP pool is configured from the four PDEV #01 through #04, the RAID level and combination of the virtual LU is RAID 5 (2D+1P), and, in addition, an initial write is generated to an unallocated virtual page (a virtual page to which a real page is not allocated) in this virtual LU, the first PDEV number 214 is "1", and therefore, respective real pages are allocated from PDEV #01, #02, and #03 to the write-destination virtual page. Thereafter, the first PDEV number 214 is updated to "4". Then, in a case where a second write is generated to an unallocated virtual page in this virtual LU, since the first PDEV number 214 is "4", respective real pages are allocated from PDEV #04, #01, and #02 to the write-destination virtual page. After this, the first PDEV number 214 is updated to "3". In this embodiment, the two or more PDEV that are the provision sources of the two or more real pages allocated to the virtual page are determined based on the order of the PDEV numbers. Furthermore, the numbers of the plurality of PDEV configuring the DP pool may be consecutive or nonconsecutive. Further, the two or more PDEV that are the provision sources of the two or more real pages allocated to the virtual page may be arranged in descending order from the largest number rather than in ascending order from the smallest number. Since the two or more provision-source PDEV are determined in PDEV number order, the PDEV inside the DP pool are used equably.

FIG. 8 shows the configuration of the virtual LU management table 507.

The virtual LU management table 507 comprises information related to the virtual LU 201, and can be used to set and check the virtual LU. Specifically, for example, the table 507 comprises a LUN 220, an assigned pool number 221, a RAID level 222, a combination 223 and a capacity 224 for each virtual LU 201.

The LUN 220 is the LUN of the virtual LU 201.

The assigned pool number 221 is the number of the DP pool (the DP pool with which the virtual LU 201 is associated) 203 to which the virtual LU 201 is assigned.

The RAID level 222 is the RAID level of the virtual LU 201.

The combination 223 is the combination of the virtual LU 201.

The capacity 224 is the capacity of the virtual LU 201.

FIG. 9 shows the configuration of the PDEV management table 509 used to create, for example, a DP pool.

The PDEV management table 509 comprises information related to the PDEV 117. Specifically, for example, the table 509 comprises a PDEV number 230, an assigned pool number 231, an IF type 232, a PDEV performance 233, a capacity 234, a free capacity 235, and a device type 236 for each PDEV 117.

The PDEV number 230 is the number of a PDEV 117.

The assigned pool number 231 is the number of the DP pool (the DP pool in which the PDEV 117 is one of the components) to which the PDEV 117 is assigned. "null" shows that the PDEV 117 is not allocated to any pool.

The IF type 232 is the type (for example, SAS, SATA, and so forth) of the interface of the PDEV 117.

The PDEV performance 233 is expressed in accordance with the device type 236 of the PDEV 117. For example, in a case where the device type 236 of the PDEV 117 is HDD, the PDEV performance 233 is shown by the rotational speed of the disk (for example, 7,200 rpm).

The capacity 234 is the capacity of the PDEV 117, that is, the total capacity of the real pages that that PDEV 117 provides.

The free capacity 235 is the total capacity of the real page that is not allocated to the virtual page from among the real pages that the PDEV 117 provides, but can be allocated to the virtual page.

The device type 236 is the type of the PDEV 117 itself. The device type 236, for example, includes HDD and SSD.

FIG. 10 shows the configuration of the real page management table 511 showing the relationship between the virtual page and the real page. The real page management table 511 is used when allocating a real page to a virtual page.

The real page management table 511 exists for each DP pool. The real page management table 511 comprises information related to a real page inside the DP pool corresponding to this table 511. Specifically, for example, the table 511 comprises a PDEV number 240, a real page number 241, a LUN 242, a virtual page number 243, and an access counter 244 for each real page.

The PDEV number 240 is the number of the PDEV 117 that provides the real page.

The real page number 241 is the number of the real page.

The LUN 242 is the LUN of the virtual LU 201 comprising the virtual page that is the allocation destination of the real page.

The virtual page number 243 is the number of the allocation-destination virtual page of the real page.

The access counter 244 is the number of times that an I/O (access) has been carried out to the real page. Furthermore, for example, in a case where there is a real access status table 515 as alternative information as in this embodiment, the access counter 244 may be eliminated.

FIG. 11 shows the configuration of the mapping management table 513 used, for example, when judging whether the real page is allocated to the virtual page that has received a write command.

The mapping management table 513 shows the corresponding relationship between the virtual page and the real page. Specifically, for example, the table 513 comprises a LUN 250, a virtual page number 251, a real page identification information 252, and an access counter 253 for each virtual page.

The LUN 250 is the LUN of the virtual LU 201 of the virtual page.

The virtual page number 251 is the number of the virtual page.

The real page identification information 252 is information for identifying the real pages that are allocated to the virtual page, and, for example, is a combination of the real page numbers and the numbers of the PDEV 117 of these real pages.

The access counter 253 is the number of times that an I/O (access) has been carried out with respect to the real page. Furthermore, for example, in a case where there is a virtual access status table 517 as alternative information as in this embodiment, the access counter 253 may be eliminated.

Figure 12:
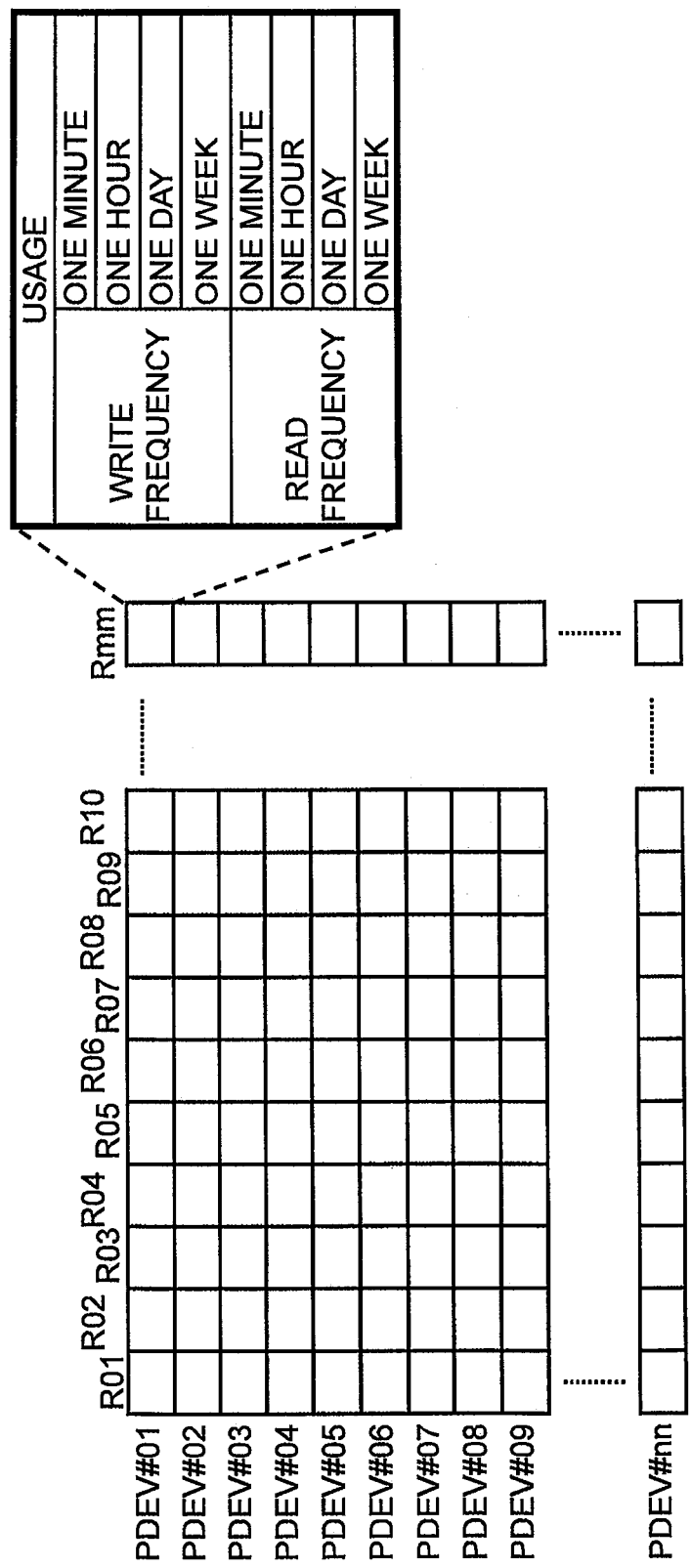
FIG. 12 shows the configuration of a real access status table 515.

FIG. 12 shows the configuration of the real access status table 515 referenced, for example, when determining a storage device for rearrange and the like.

The real access status table 515 comprises information, which is common to one or more DP pools 203, and which shows the access state for each real page. Specifically, for example, the table 515 comprises a cell for each real page, and the cell comprises information showing the access frequency with respect to the real page (hereinafter, real access frequency information). The real access frequency information, for example, includes information showing the usage of the real page corresponding to this information, and shows the write frequency and the read frequency separately. The write frequency is the number of writes per unit period, specifically, for example, the number of writes per minute, hour, day and week. The read frequency is the number of reads per unit period, specifically, for example, the number of reads per minute, hour, day and week.

In a case where one PDEV 177 is added to any DP pool 203, a record corresponding to this added PDEV 117 is added to the table 515. Further, in a case where one PDEV 177 is removed from any DP pool 203, the record corresponding to this removed PDEV 117 is removed from the table 515.

Figure 13:
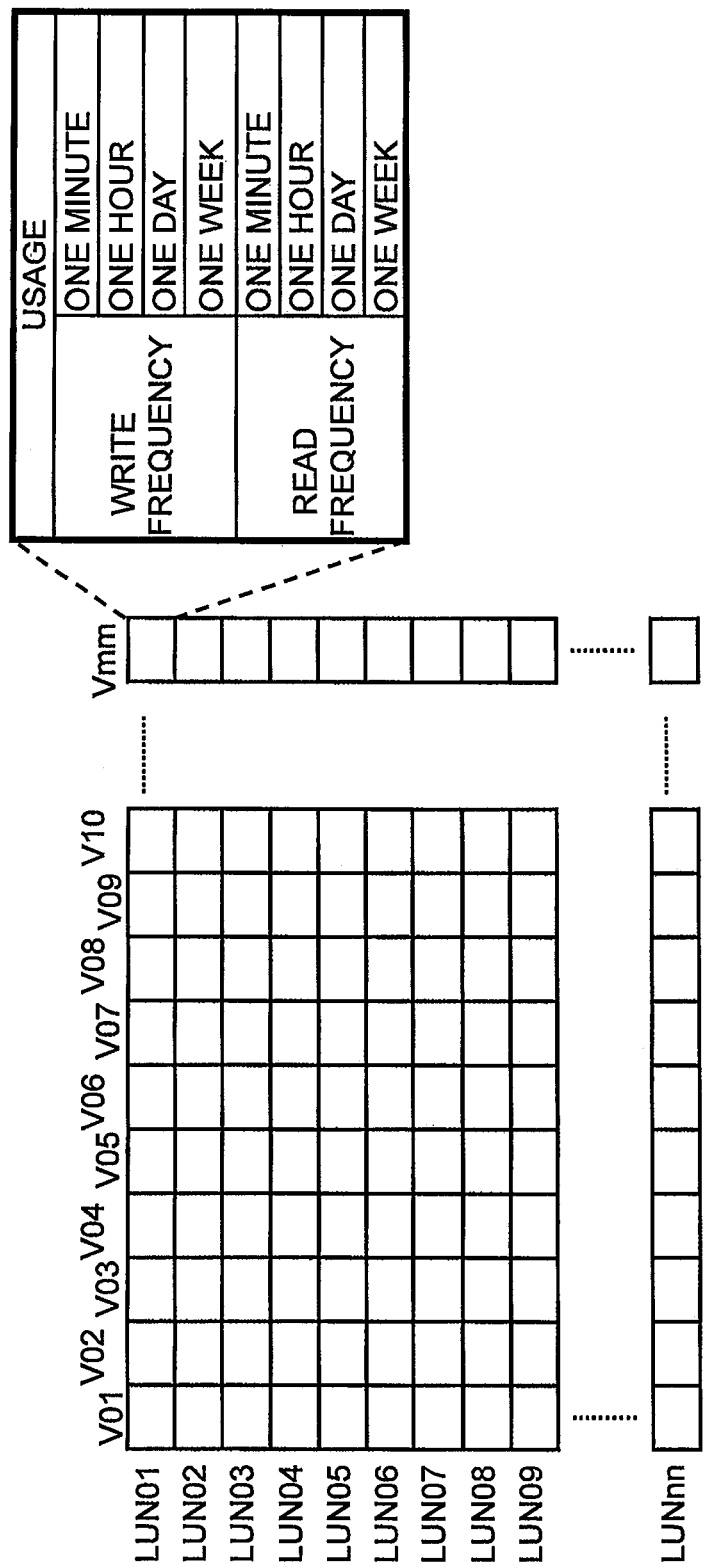
FIG. 13 shows the configuration of a virtual access status table 517.

FIG. 13 shows the configuration of the virtual access status table 517 referenced, for example, when determining the virtual page for rearrange and the like.

The virtual access status table 517 comprises information denoting the access status of each virtual page. Specifically, for example, the table 517 comprises a cell for each virtual page, and the cell comprises information showing the access frequency with respect to the virtual page (hereinafter, virtual access frequency information). The virtual access frequency information, for example, includes information showing the usage of the virtual page corresponding to this information, and shows both the write frequency and the read frequency. The write frequency is the number of writes per unit period, specifically, for example, the number of writes per minute, hour, day and week. The read frequency is the number of reads per unit period, specifically, for example, the number of reads per minute, hour, day and week.

In a case where one virtual LU 201 is associated with any DP pool 203, a record corresponding to this associated virtual LU 201 is added to the table 517. Further, in a case where one virtual LU 201 is disassociated from any DP pool 203, the record corresponding to this disassociated virtual LU 201 is removed from the table 517.

Furthermore, instead of showing the write frequency and the read frequency separately, at the least one of the virtual access frequency information and the above-mentioned real access frequency information may show the access frequency without regard for a write or a read, may show only the write frequency, or may show only the read frequency.

Further, at the least one of the virtual access frequency information and the above-mentioned real access frequency information may be updated each time an access occurs with respect to a virtual area or a real page, or may be updated on a predetermined schedule (for example, regularly). For example, the control processing program 501 may manage a processed command log in the memory 123. The command log may comprise, for example, a type, a date/time (for example, date/time received, process completion date/time, or a date/time of an I/O command time stamp), the number of the access-destination virtual page, and the identification information of the access-destination real page (for example, a combination of the PDEV number and the real page number) for each processed I/O command. In a case where an I/O command has been processed, the control processing program 501 may add to the command log the type, date/time, number of the access-destination virtual page, and identification information for the access-destination real page related to this I/O command. The control processing program 501 may update the virtual access frequency information and the real access frequency information based on this command log.

Figure 14:
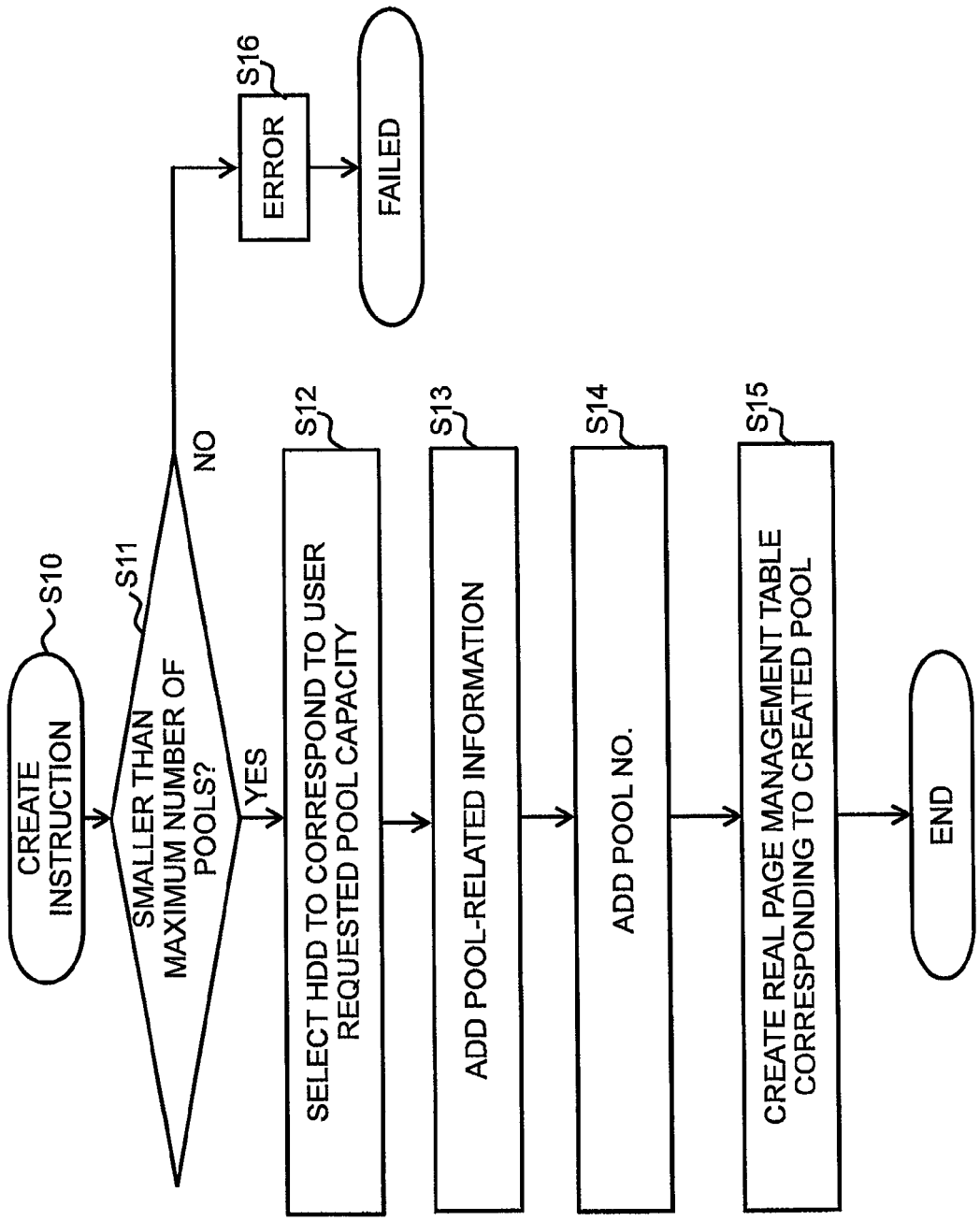
FIG. 14 is a flowchart showing the flow of processing for creating a DP pool.

FIG. 14 is a flowchart showing the flow of processing for creating a DP pool.

(S10)

The control processing program 501 receives a create pool instruction from the management apparatus 105. The parameter of the create pool instruction, for example, is at the least (p1) of the following (p1) through (p3). The (p1) is a parameter that must be input by the user, the (p2) and the (p3) are parameters that are input at the discretion of the user.

(p1) Capacity requested by the user (for example, the administrator) (user-requested pool capacity). The user-requested pool capacity differs from the real allocation capacity 212. This is because the real allocation capacity 212 is the total capacity of the PDEV that belong to a DP pool.

(p2) Information denoting PDEV 117 attribute (PDEV information). For example, the device type, IF type and PDEV performance.

(p3) The number assigned to a pool (pool number).

(S11)

The control processing program 501 determines whether or not the number of DP pools 203 specified from the pool management table 505 is smaller that the value 201 of the maximum number of creatable pools. In a case where the result of this determination is affirmative, S12 is performed. In a case where the result of this determination is negative, the control processing program 501 sends information denoting an error to the management apparatus 105, and the management apparatus 105 displays an error (S16).

(S12)

The control processing program 501 selects PDEV 117 so that the total capacity is greater than the user-requested pool capacity. Specifically, for example, the control processing program 501 carries out the following processing.

(S12-1): The control processing program 501 references the PDEV management table 509, and specifies a PDEV (a PDEV that is not assigned to any DP pool 203) for which the assigned pool number 231 is "null". The specified PDEV is a DP pool component candidate. Furthermore, in a case where the PDEV information is the parameter of the create pool instruction, the assigned pool number 231 is "null", and, in addition, the PDEV that conforms to this PDEV information is specified as the DP pool component candidate. Hereinafter, the PDEV specified in this (S12-1) will be called the "candidate PDEV".

(S12-2): The control processing program 501 selects from a plurality of candidate PDEV the PDEV having a total capacity greater than the user-requested pool capacity. As a result of this, the total capacity of the selected PDEV (the real allocation capacity of the DP pool) is either the same as or larger than the user-requested pool capacity. Furthermore, the RAID level and combination may also be taken into consideration in PDEV selection. For example, in the case where a user-requested pool capacity is 1 TB (one terabyte), the control processing program 501 may select PDEV from a plurality of PDEV so that the total capacity of the selected PDEV is 1.3 times the user-requested pool capacity (1.3 TB). In a case where virtual LU having different RAID levels and combination are associated with the created DP pool, a PDEV may be selected on the basis of the parity ratio of the RAID level and combination having the highest parity ratio. Further, in a case where the RAID level and combination of the virtual LU associated with the DP pool has been decided, the PDEV may be selected on the basis of the parity ratio of this RAID level and combination. Furthermore, the "parity ratio" is the percentage of the total size of the created parity with respect to the size of the I/O-targeted data for the virtual page.

(S13)

The control processing program 501 adds information related to the created DP pool to the pool management table 505. The following information is added as information related to the created DP pool.

- Pool number 210: A number determined in accordance with a prescribed rule (for example, the number after the largest number of the pool number 210 registered in the pool management table 505). Or, the pool number denoted by the above-mentioned parameter (p3) of S10.
- PDEV number list 211: The PDEV numbers selected in S12.
- Real allocation capacity 212: The total capacity of the PDEV selected in S12.
- Utilization capacity 213: Zero. This is because a real page is not allocated from the DP pool.
- First PDEV number 214: A number determined in accordance with a prescribed rule from among the PDEV numbers selected in S12. For example, the smallest number of the PDEV numbers selected in S12.

(S14)

The control processing program 501 updates the assigned pool number 231 of the PDEV selected in S12 from "null" to the number of the created DP pool (the number in S13) in the PDEV management table 509.

(S15)

The control processing program 501 partitions the storage space of the respective PDEV (the respective PDEV selected in S12) configuring the created DP pool with respect to each real page capacity, and manages the respected real pages obtained in accordance with this. Specifically, the control processing program 501 creates a real page management table 511 corresponding to the created DP pool, and stores this table 511 in the memory 123. The respective records of the created real page management table 511 comprise the following information.

PDEV number 240: Any PDEV number selected in S12.
Real page number 241: Any serial number assigned to the real pages provided by the PDEV selected in S12.
LUN 242: null. This is because none of the real pages has been allocated to any of the virtual pages.
Virtual page number 243: null. This is because none of the real pages has been allocated to any of the virtual pages.
Access counter 244: Zero. This is because an I/O is not generated for any real page.

Figure 15:
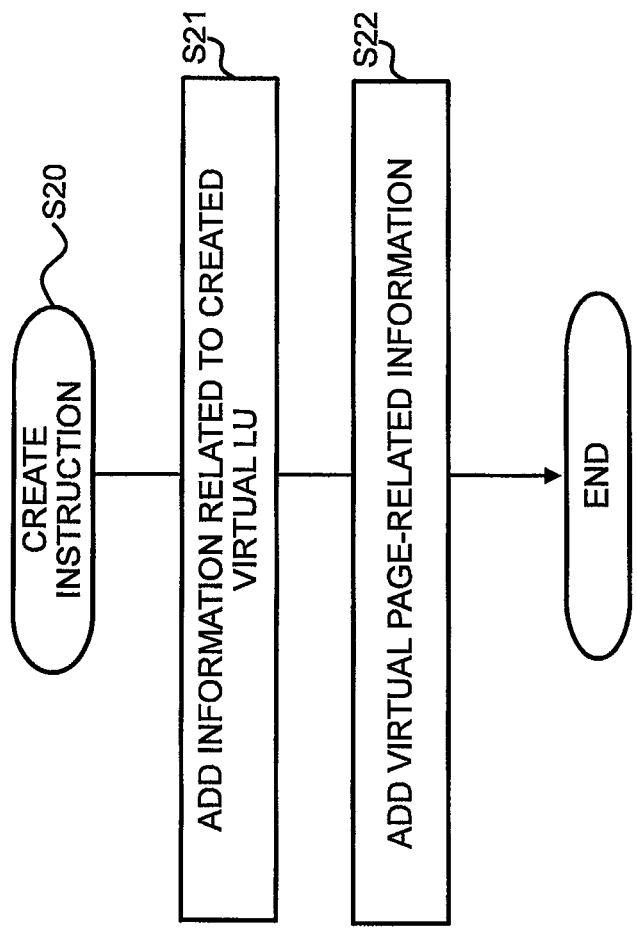
FIG. 15 is a flowchart showing the flow of processing for creating a virtual LU 201.

FIG. 15 is a flowchart showing the flow of processing for creating a virtual LU 201.

(S20)
The control processing program 501 receives a virtual LU create instruction from the management apparatus 105. The virtual LU create instruction, for example, has as a parameter at the least (p15) of the following (p11) through (p15). The (p15) is a parameter that must be inputted by the user, and the (p11) through the (p14) are parameters that are inputted at the discretion of the user. A parameter from among the parameters (p11) through (p14) that is not inputted by the user is a value (a default value) determined in accordance with a prescribed rule.

(p11) LUN assigned to the virtual LU to be created. The default value, for example, is the smallest number of a group of numbers capable of being assigned as the LUN of the virtual LU.
(p12) The number of virtual LU to be created. The default value is "1".
(p13) The DP pool number of the assigned destination of the virtual LU to be created (the pool number). The default value is the smallest number of the created DP pool numbers.
(p14) The RAID level (simultaneous setting of a combination). The default number, for example, is RAID 5 (2D+1P).
(p15) The capacity of the virtual LU.

(S21)
The control processing program 501 adds to the virtual LU management table 507 information related to the virtual LU to be created for each virtual LU in the number of virtual LU denoted in the above-mentioned (p12). The following information is added as information related to the virtual LU to be created.

LUN 220: LUN denoted by the above-mentioned parameter (p11).
Assigned pool number 221: Pool number denoted by the above-mentioned parameter (p13). The number of virtual LU denoted by the above-mentioned (p12) is associated with the DP pool having the pool number denoted by the above-mentioned parameter (p13).
RAID level 222: The RAID level denoted by the above-mentioned parameter (p14).
Combination 223: The combination denoted by the above-mentioned parameter (p14).
Capacity 224: The capacity denoted by the above-mentioned parameter (p15).

(S22)
The control processing program 501 adds to the mapping management table 513 information related to the respective virtual pages of the virtual LU to be created for each virtual LU in the number of virtual LU denoted in the above-mentioned (p12). For example, the information added for the respective the virtual pages is as follows.

LUN 250: LUN of the virtual LU comprising the virtual page.
Virtual page number 251: The number of the virtual page.
Real page identification information 252: null. This is because a real page is not allocated to any of the virtual pages.
Access counter 253: Zero. This is because an I/O is not generated for any virtual page.

Figure 16:
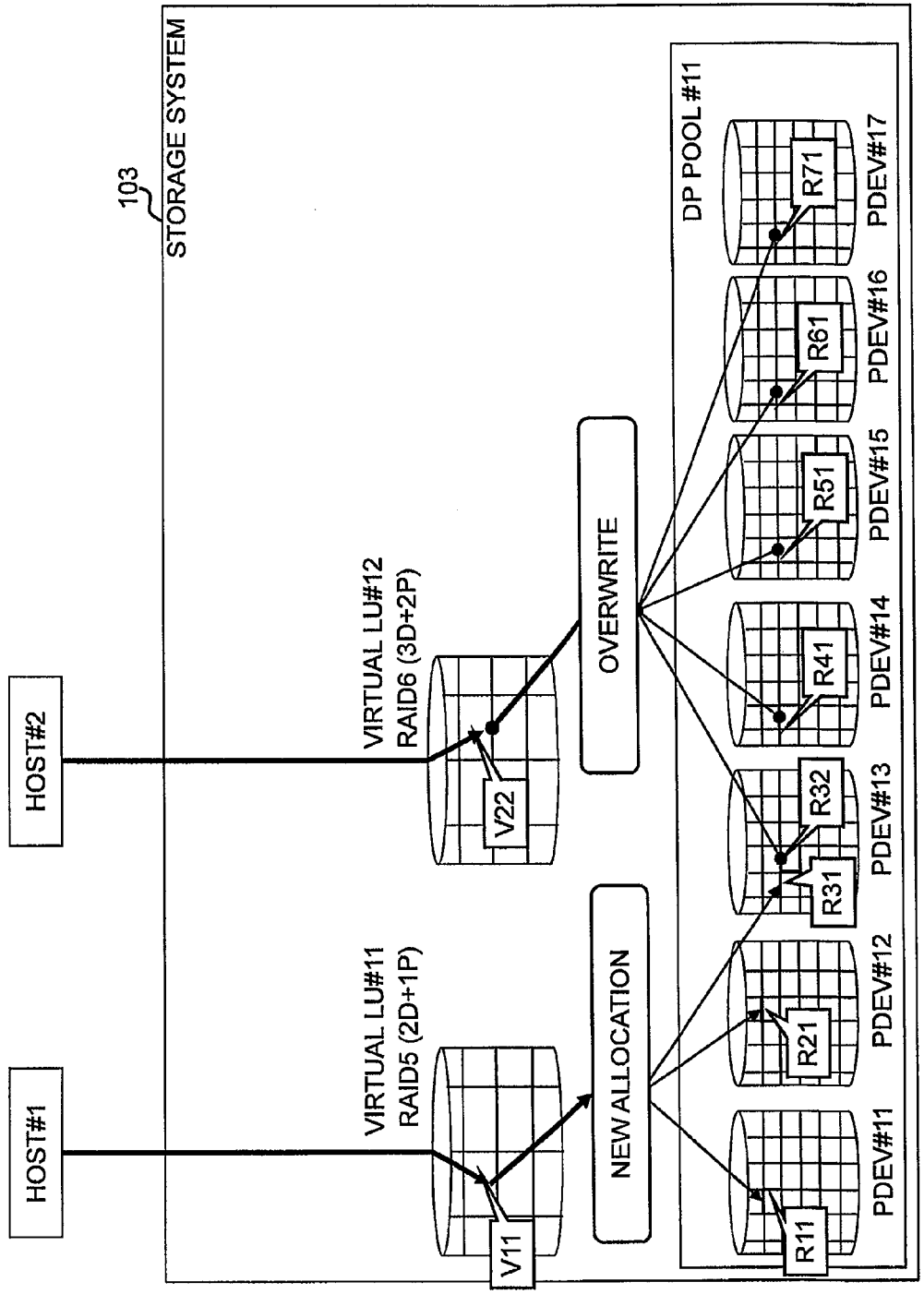
FIG. 16 shows an overview of the flow of a write to a virtual page.

FIG. 16 shows an overview of the flow of a write to a virtual page. The flow of a write to a virtual page for which a real page is not allocated, and the flow of a write to a virtual page for which a real page has been allocated will be explained below.

<Case 1: Write to a Virtual Page for which a Real Page is not Allocated>
The following processing is carried out.

(w11) The control processing program 501 receives from the host #1 a write command specifying the virtual page V11 of the virtual LU #11, references the mapping management table 513, and specifies the fact that a real page is not allocated to the write-destination virtual page V11.
(w12) The control processing program 501 references the virtual LU management table 507, and specifies that the RAID level of the virtual LU #11 that comprises the virtual page V11 is RAID 5 (2D+1P).
(w13) The control processing program 501 references the real page management table 511 corresponding to the DP pool #11 to which the virtual LU #11 is assigned, and selects the three real pages having different PDEV numbers 240 (the number of real pages based on the RAID level (RAID 5 (2D+1P)) specified in (w12)) from the real pages for which the LUN 242 and the virtual page number 243 are null. The real page R11 inside PDEV #11, the real page R21 inside PDEV #12, and the real page R31 inside PDEV #13 are selected here.
(w14) The control processing program 501 allocates the real pages R11, R21, and R31 selected in (w13) to the virtual page V11 and updates the mapping management table 513.
(w15) The control processing program 501 writes two data elements obtained by partitioning the write-targeted data for the virtual page V11 to two of the three real pages R11, R21, and R31, and writes the parity based on these two data elements to the one remaining real page of these three real pages.

<Case 2: Write to a Virtual Page for which a Real Page has Been Allocated>
The following processing is carried out.

(w21) The control processing program 501 receives from the host #2 a write command specifying the virtual page V22 of the virtual LU #12, references the mapping management table 513, and specifies the real page that has been allocated to the write-destination virtual page V22. Since the RAID level of the virtual LU #12 that comprises the virtual page V22 is RAID 6 (3D+2P), five real pages are allocated to the virtual page V22, and these five real pages are specified in (w21). Specifically, the real page R32 inside PDEV #13, the real page R41 inside PDEV #14, the real page R51 inside PDEV #15, the real page R61 inside PDEV #16, and the real page R71 inside PDEV #17 are selected.
(w22) The control processing program 501 writes three data elements obtained by partitioning the write-targeted data for the virtual page V22 among three of the five real pages R32, R41, R51, R61, and R71 specified in (w21), and writes two parities based on these three data elements to the two remaining real pages of these five real pages.

Figure 17:
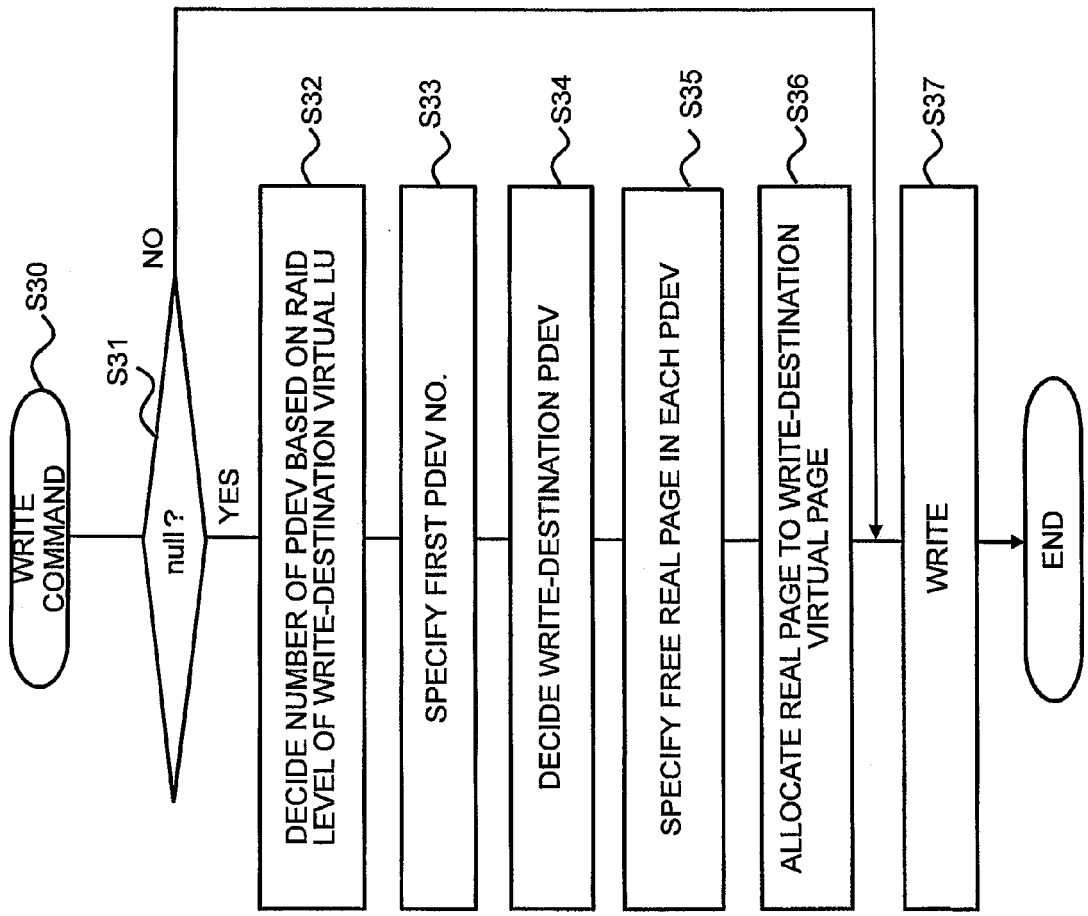
FIG. 17 is a flowchart showing the flow of processing for writing to a virtual page.

FIG. 17 is a flowchart showing the flow of processing for a write to a virtual page.

(S30)
The control processing program 501 receives a write command comprising write-destination information and write-targeted data. The write-destination information includes a LUN and a LBA. The write-targeted data is written to the memory 123 (the cache area).

(S31)

The control processing program 501 references the mapping management table 513, and determines whether or not a real page has been allocated to the virtual page (write-destination virtual page) specified from the write-destination information.

<A Case where the Result of the Determination of (S31) is Affirmative (a Case where the PDEV Identification Information 252 for the Write-Destination Virtual Page is not Null)>

This corresponds to the above-mentioned Case 2. Specifically, S37 is carried out without performing S32 through S36. That is, the control processing program 501 writes the write-targeted data (for example, the two or more data elements and one or more parities obtained by partitioning this data) to the real pages (for example, the real pages R32, R41, R51, R61, and R71 of FIG. 16) that have been allocated to the write-destination virtual page (for example, the virtual page V22 of FIG. 16) based on the RAID level of the virtual LU (for example, the virtual LU #12 of FIG. 16) comprising the write-destination virtual page. Then, the control processing program 501 performs the following write status update process:

- Increments by 1 the value of the access counter 253 corresponding to the write-destination virtual page;
- Updates the virtual access frequency information (the information inside the virtual access status table 517) corresponding to the write-destination virtual page (specifically, performs an update that increases the write frequency (one minute, one hour, one day, or one week));
- Increments by 1 the value of the access counter 244 corresponding to the respective real pages allocated to the write-destination virtual page; and
- Updates the real access frequency information (the information inside the real access status table 515) corresponding to the respective real pages allocated to the write-destination virtual page (specifically, performs an update that increases the write frequency (one minute, one hour, one day, or one week)). Furthermore, the real pages allocated to the write-destination virtual page are able to be specified from the mapping management table 513. The virtual LU comprising the write-destination virtual page (hereinafter, the write-destination virtual LU) is able to be identified from the LUN of the write-destination information. The RAID level of the write-destination virtual LU is able to be specified from the virtual LU management table 507.

<A Case where the Result of the Determination of (S31) is Negative (a Case where the PDEV Identification Information 252 for the Write-Destination Virtual Page is Null)>

This corresponds to the above-mentioned Case 1. For this reason, S32 through S36 are carried out, and thereafter, S37 is performed.

(S32)

The control processing program 501 specifies the RAID level 222 and combination 223 (for example, RAID 5 (2D+1P) corresponding to the write-destination virtual LU (for example, the virtual LU #11 of FIG. 16). The control processing program 501 determines the number K of selected PDEV based on the specified RAID level 222 and combination 223. For example, in a case where the combination denoting the RAID level is "nD+mP (or D)" (where n is a natural number and m is an integer of 0 or more), the number K of selected PDEV is (n+m). Specifically, for example, in a case where the combination is "2D+1P", K=2+1=3.

(S33)

The control processing program 501 specifies the assigned pool number 221 corresponding to the write-destination virtual LU and the first PDEV number 214 corresponding to the pool number 210 of the same value.

(S34)

The control processing program 501 selects the same number of PDEV numbers as the number K selected in S32 from the assigned pool number 221 corresponding to the write-destination virtual LU and the PDEV number list 211 corresponding to the pool number 210 of the same value. At this time, the control processing program 501, first selects the same PDEV number (for example, #11) as the first PDEV number 214 selected in S33, makes this PDEV number the first PDEV number, and selects the PDEV numbers in order from the smallest PDEV number until the number of selected PDEV numbers reaches K. In a case where the selected PDEV number reaches the largest number of the PDEV number list 211 corresponding to the DP pool (for example, DP pool #11 of FIG. 16) to which the write-destination virtual LU is assigned prior to the number of selected PDEV numbers having reached the K, the smallest number of this PDEV number list 211 is selected.

Furthermore, in this (S34), the PDEV numbers (PDEV) may be selected as follows instead of selecting the PDEV number (PDEV) in accordance with the PDEV number order.

- Preferentially select the PDEV with the most free capacity 235. In accordance with this, the PDEV in the DP pool can be expected to be used equally.
- Select PDEV for which either one or both of the IF type 232 and the PDEV performance 233 are the same. In accordance with this, I/O performance with respect to the real pages allocated to one virtual page can be expected to be the same.

(S35)

The control processing program 501 selects one free real page from the respective PDEV specified from the PDEV numbers selected in S34. Specifically, for example, the control processing program 501 selects any real page number 241 that corresponds to a LUN 242 and virtual page number 243 that are null for each selected PDEV number based on the real page management table 511 corresponding to the DP pool to which the write-destination virtual LU belongs. According to the example of FIG. 16, the real page number R11 is selected for the PDEV number #11, the real page number R21 is selected for the PDEV number #12, and the real page number R31 is selected for the PDEV number #13.

(S36)

The control processing program 501 updates the real page identification information 252 corresponding to the write-destination virtual page from null to a combination of the real page numbers 241 in S35 and the PDEV numbers 240 corresponding to these numbers 241 (for example, #11-R11, #12-R21, #13-R31). That is, the control processing program 501 allocates the two or more free real pages selected in S35 to the write-destination virtual page (for example, the virtual page V11 in FIG. 16).

(S37)

The control processing program 501, based on the RAID level and combination of the write-destination virtual LU, writes the write-targeted data to the two or more real pages allocated in S36. According to the example of FIG. 16, the two data elements and one parity are written to the three real pages R11, R21, and R31. Then, the control processing program 501 performs the write status update process as described hereinabove. In accordance with this, the value of the access counter 253 corresponding to the write-destination virtual page, the virtual access frequency information corresponding to the write-destination virtual page, the value of the access counter 244 corresponding to the respective real pages allocated to the write-destination virtual page, and the real access frequency information corresponding to the respective real pages allocated to the write-destination virtual page are updated.

Figure 18:
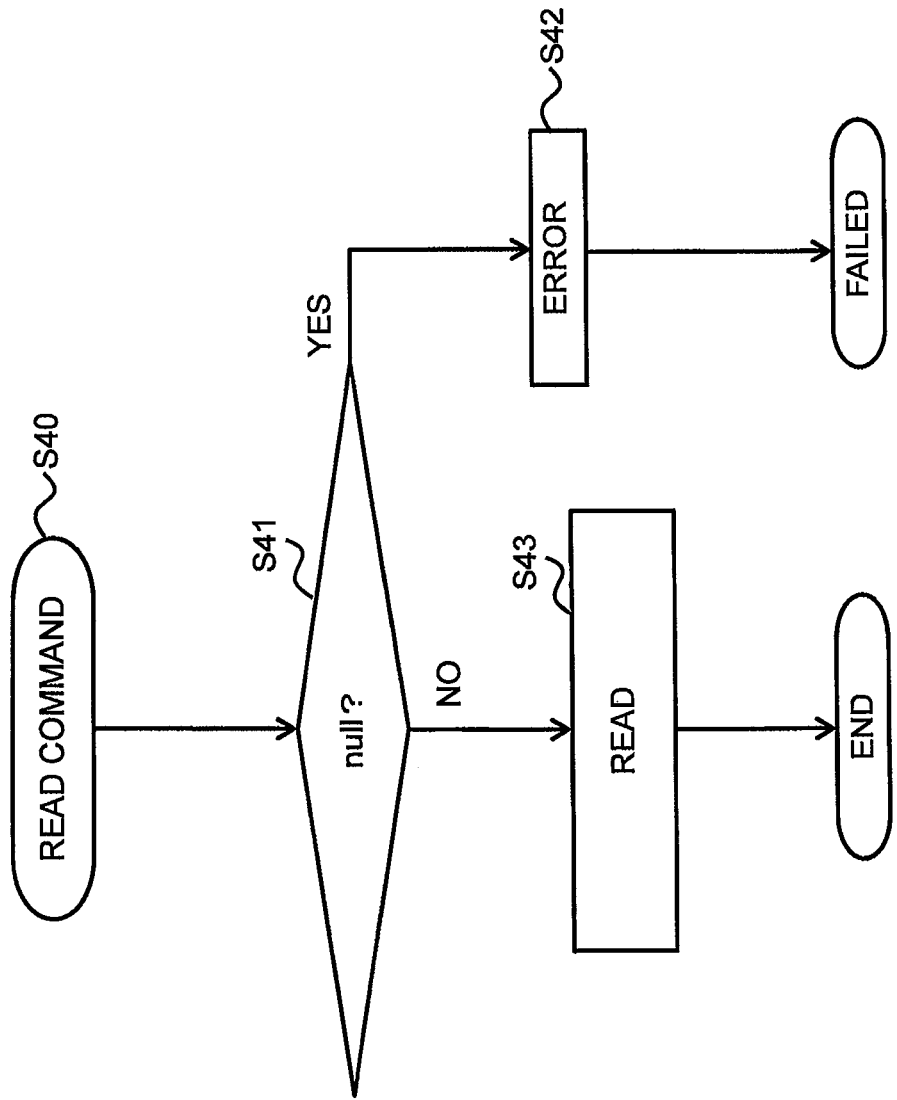
FIG. 18 is a flowchart showing the flow of processing for reading from a virtual page.

FIG. 18 is a flowchart showing the flow of processing of a read with respect to a virtual page.

(S40)

The control processing program 501 receives a read command comprising read-source information. The read-source information, for example, comprises a LUN and a LBA.

(S41)

The control processing program 501 references the mapping management table 513, and determines whether or not a real page is allocated to the virtual page specified from the read-source information (the read-source virtual page). In a case where the result of the determination in S41 is negative, S42 is carried out. In a case where the result of the determination in S41 is affirmative, S43 is carried out.

(S42)

The control processing program 501 sends an error to the host that is the source of the read command.

(S43)

The control processing program 501 reads two or more data elements (and one or more parities) from the two or more real pages allocated to the read-source virtual page, and sends to the read command-source host the data configured by the two or more data elements that have been read (that is, the read-targeted data) (the read-targeted data may be data that includes a data element that was recovered using parity). Then, the control processing program 501 performs the following read status update process:

Increments by 1 the value of the access counter 253 corresponding to the read-source virtual page;

Updates the virtual access frequency information (the information inside the virtual access status table 517) corresponding to the read-source virtual page (specifically, performs an update that increases the read frequency (one minute, one hour, one day, or one week));

Increments by 1 the value of the access counter 244 corresponding to the respective real pages allocated to the read-source virtual page; and Updates the real access frequency information (the information inside the real access status table 515) corresponding to the respective real pages allocated to the read-source virtual page (specifically, performs an update that increases the read frequency (one minute, one hour, one day, or one week)).

Figure 19:
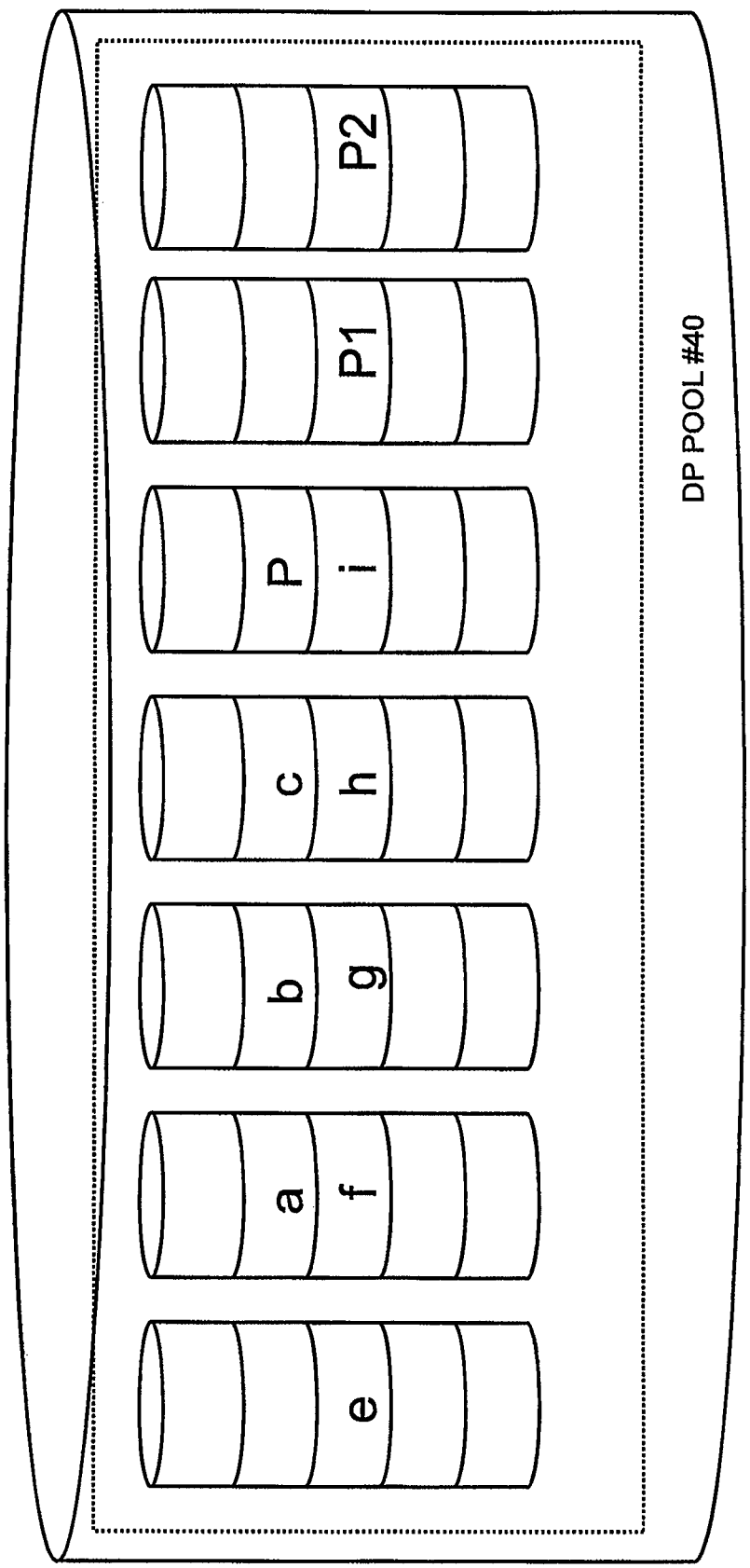
FIG. 19 shows how data stored in accordance with a plurality of RAID types is mixed together in a single DP pool.

As explained hereinabove, in this embodiment, a real page that configures a DP pool 203 is not a substantial storage area provided from a RAID group, but rather is a storage area that is provided from one PDEV. Then, it is possible to associate a plurality of virtual LU with different RAID level definitions in a single DP pool 203. For this reason, as shown in the example of FIG. 19, in one DP pool #40, data respectively stored at different RAID levels, such as a set of data (data elements a, b and c) and parity P stored, for example, at RAID 5 (3D+1P) is mixed together with a set of data (data elements e, f, g, h and i) and parities P1 and P2 stored at RAID 6 (5D+2P). In accordance with this, in a case where a RAID level or a combination defined for a certain virtual LU is changed to a different RAID level or a combination, the reconstruction of the data may be carried out only for the real page(s) allocated to this virtual LU. For example, in a case where the RAID level (or combination) of the virtual LU changes from a first RAID level (or combination) to a second RAID level (or combination), the control processing program 501 carries out, for each virtual page, the following processing—(k1) to (k3)—for each virtual LU to which a real page is allocated:

(k1) Reads v data units from v real pages allocated to the virtual page U, and constructs the data based on the v data units (a "data unit" as used in the explanation of this embodiment is a generic term for either a data element or a parity that is stored in the real page);

(k2) respectively selects from w PDEV of the DP pool to which the virtual LU is associated w real pages on the basis of the second RAID level and combination, and allocates the selected w real pages to the virtual page instead of the v real pages of (k1); and (k3) writes the w data units based on the data constructed in (k1) to the allocated w real pages. Furthermore, in (k2), the w real pages may be selected so that the utilization rates of the respective PDEV in the DP pool associated with the virtual LU for which the RAID level (or combination) changed become uniform. In accordance with this, the utilization rates of the respective PDEV that belong to the DP pool with which this virtual LU is associated can be expected to be made uniform as a result of changing the RAID level (or combination) that is defined for the virtual LU. In this case, the w real pages may be selected so that not the utilization rates of the respective PDEV but the free capacity of the respective PDEV become uniform.

Figure 20:
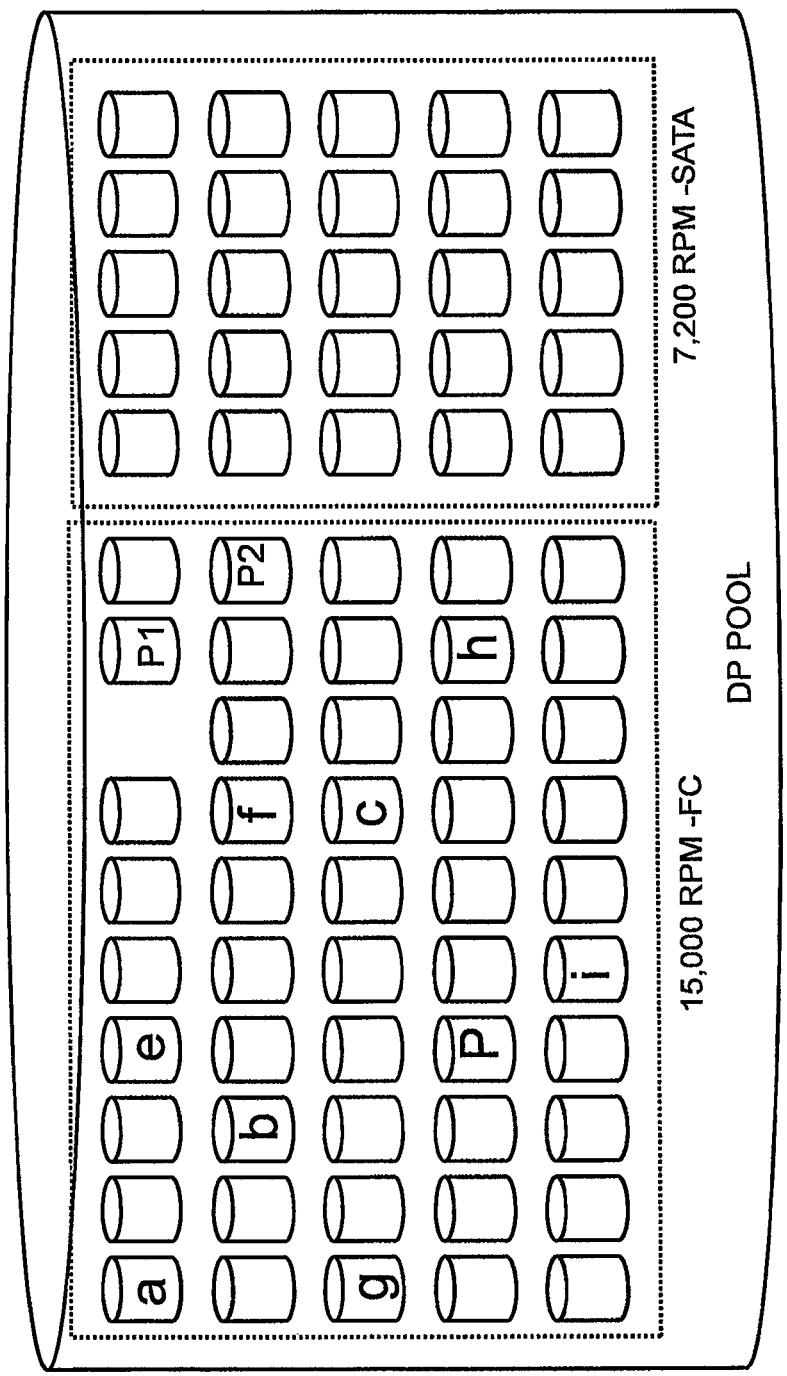
FIG. 20 shows an example of the arrangement of data units (generic name for data elements and parity) in a case where a PDEV allocated to a single virtual page is selected without relying on the PDEV number.

Further, in the above explanation, the source PDEV for the real page(s) allocated to the virtual page is selected in PDEV number order, but, for example, as shown in FIG. 20, the PDEV may be selected at random. According to the example of FIG. 20, the data elements a, b, and c and the parity P in conformance with the RAID 5 (3D+1P), and the data elements e, f, g, h, and i and the parities P1 and P2 in conformance with the RAID 6 (5D+2P) are stored in the real pages of the respective PDEV that were selected without relying on the PDEV number. Furthermore, instead of relying on the PDEV number, the PDEV utilization rate (or free capacity) may be taken into consideration. This is to make the utilization rates (or free capacity) of the plurality of PDEV in the DP pool equable.

Further, the control processing program 501 may allocate a plurality of real pages to one virtual page from a plurality of PDEV that are coupled to the same backend coupling device 113. In accordance with this, the access performance to these plurality of real pages can be expected to be made uniform. Furthermore, in a case where the utilization rates (or free capacity) of the plurality of PDEV that are coupled to the same backend coupling device 113 are not equable, a plurality of real pages may be allocated to the virtual page from a plurality of PDEV coupled to a plurality of backend coupling devices 113.

Now then, in this embodiment, a rearrange process, by which a data unit is migrated from a real page inside a certain HDD to a real page inside a different PDEV, is performed.

For example, this rearrange process is carried out when a PDEV is added or removed. Specifically, for example, in a case where the total capacity of the free real pages in the DP pool 203 is insufficient (for example, a case in which the ratio of the utilization capacity 213 to the real allocation capacity 212 of the DP pool 203 is not less than a predetermined threshold), the addition of a PDEV is carried out to increase the free real pages. The addition of a PDEV to the DP pool 203 may be carried out in PDEV units. Furthermore, it is possible for the control processing program 501 to detect the fact that the total capacity of the free real pages is insufficient by referencing the pool management table 505. In a case where the control processing program 501 detects that the total capacity of the free real pages is insufficient, the control processing program 501 sends the management apparatus 105 a warning and the number of the DP pool in which the total capacity of the free real pages is insufficient. The management apparatus 105 displays the warning and DP pool number. The user sees this warning and DP pool number, adds a PDEV, and makes the added PDEV a member of the DP pool identified from the DP pool number displayed together with the warning. Furthermore, the addition of a PDEV is not limited to when the total capacity of the free real pages is insufficient, and may also be carried out at other times (for example, in accordance with a prescribed plan).

Figure 21:
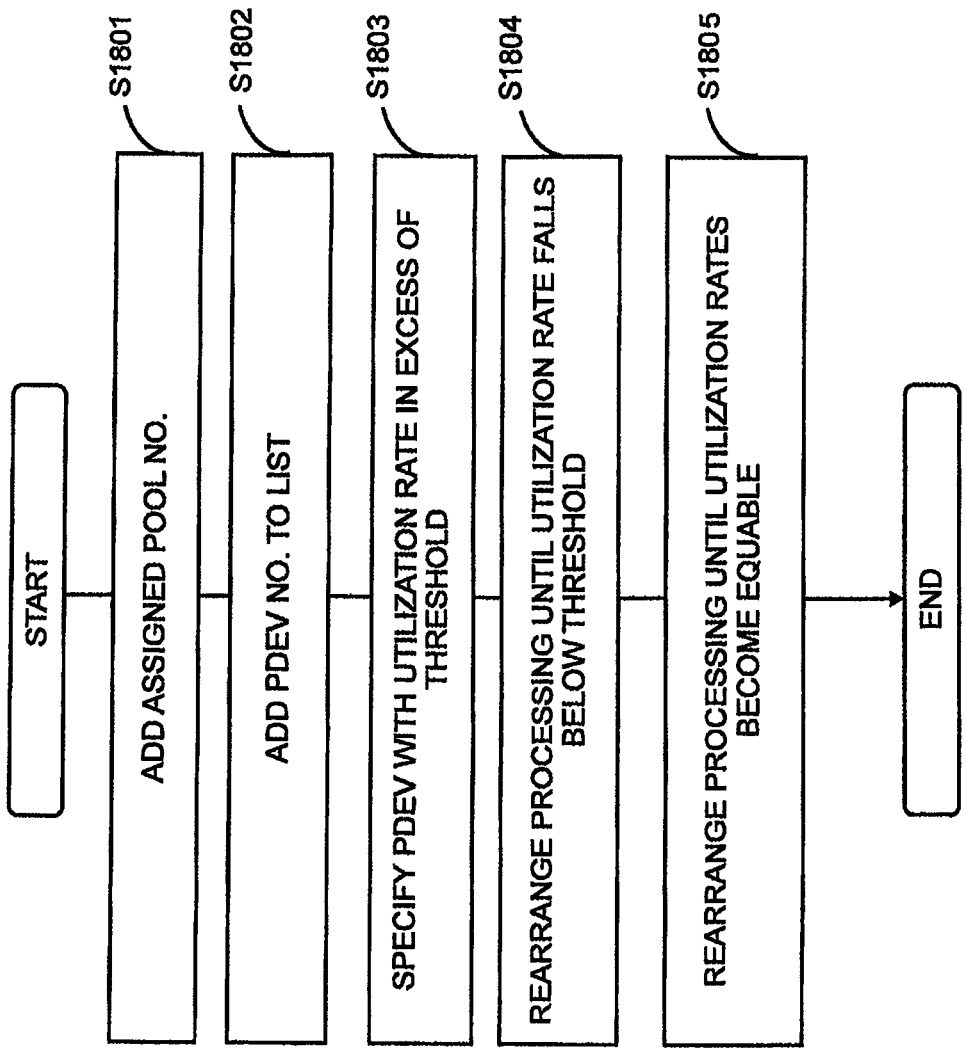
FIG. 21 is a flowchart for processing carried out when adding a PDEV.

FIG. 21 is a flowchart of the processing carried out when adding a PDEV.

(S1801)

In a case where a PDEV has been added (for example, a case in which the control processing program 501 has detected that a PDEV has been added), the control processing program 501 adds information (a record) related to the added PDEV (hereinafter, the added PDEV) to the PDEV management table 509. Of the information related to the PDFV, the IF type 232, the PDEV performance 233, the capacity 234, and the free capacity 235 portions of the information related to the PDEV may be inputted by the user via the management apparatus 105, or may be acquired from the added PDEV. The PDEV number 230 may be inputted by the user via the management apparatus 105, or may be determined by the control processing program 501. The control processing program 501 adds the assigned pool number 231, that is, the number of the DP pool in which the added PDEV has become a member to the information related to the added PDEV in the PDEV management table 509. This assigned pool number 231 may be a number inputted by the user via the management apparatus 105, or may be a number that was determined by the control processing program 501 (for example, the number of the DP pool in which the shortage of free real page total capacity was detected).

(S1802)

The control processing program 501 adds the number of the added PDEV to the PDEV number list 211 (hereinafter, referred to as the "target list 211" in the explanation of FIG. 21) corresponding to the same pool number 210 (refer to FIG. 7) as the assigned pool number 231 added in S1801, and, in addition, adds the capacity of the added PDEV to the real allocation capacity 212 corresponding to this pool number 210. Further, the control processing program 501 adds the information (records) corresponding to the respective real pages of the added PDEV to the real page management table 511 that corresponds to the assigned pool number 231 added in S1801.

(S1803)

From among the capacity 234 and the free capacity 235 managed in the PDEV management table 509, the control processing program 501 references the capacity 234 and the free capacity 235 corresponding to the PDEV that belongs to the target list 211, and computes the utilization rate (the ratio of the free capacity 235 to the capacity 234) of the respective PDEV in the target list 211. Then, the control processing program 501 specifies the PDEV for which the utilization rate exceeds a predetermined threshold.

(S1804)

The control processing program 501 executes the rearrange process until the utilization rate of the PDEV specified in S1803 becomes less than the predetermined threshold. The "rearrange process" is the process for migrating a data unit from a real page inside a certain PDEV to a real page inside a different PDEV in a single DP pool.

(S1805)

The control processing program 501 executes the rearrange process until the utilization rates of all the PDEV in the DP pool comprising the added PDEV become equable. In this process executed in a case where a PDEV is added, the PDEV which is the target of the rearrange process may be decided based on not the utilization rates of the PDEV but free capacity of the PDEV.

Figure 22:
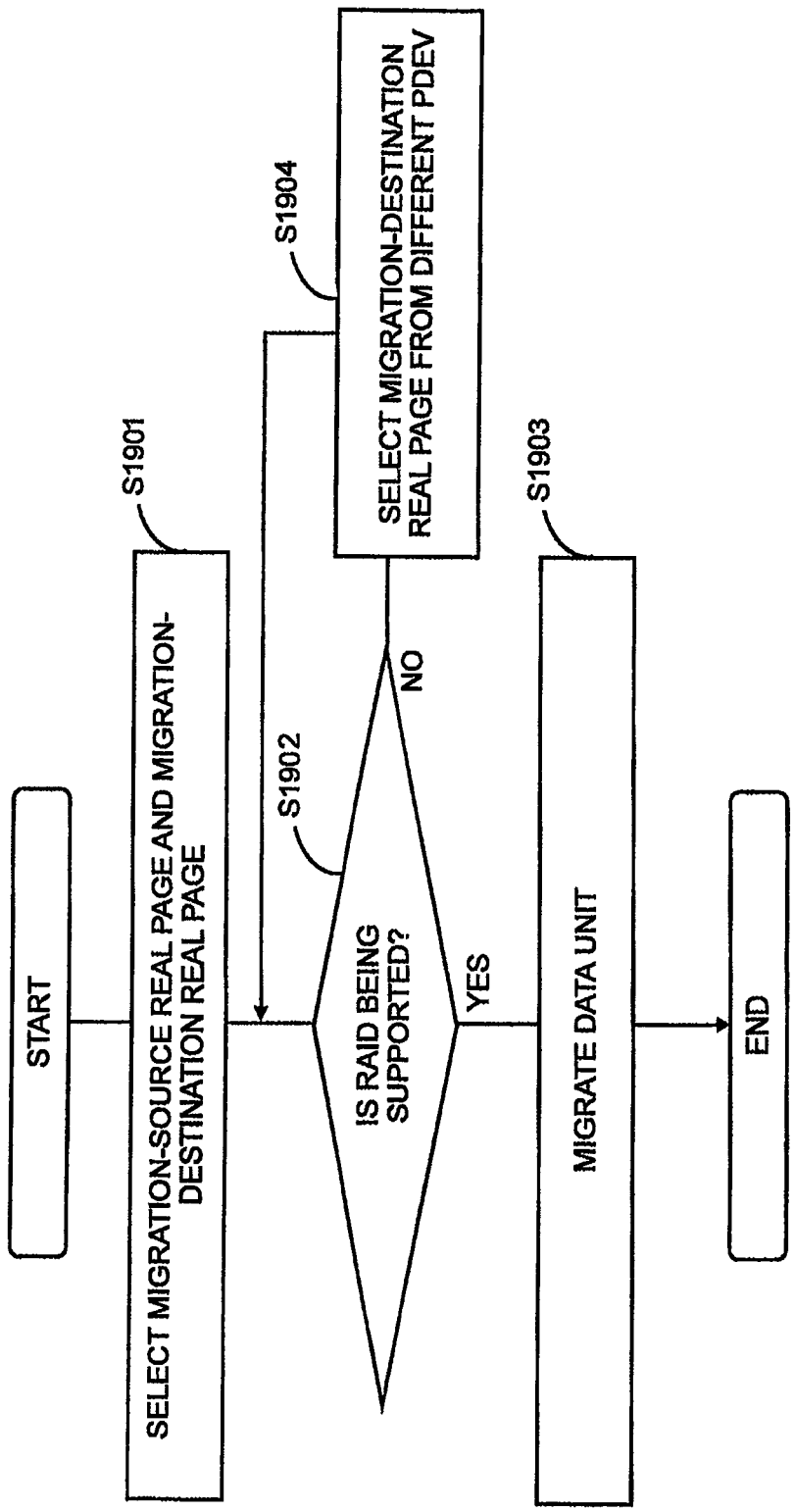
FIG. 22 shows a flowchart of a rearrange process.

FIG. 22 shows a flowchart of the rearrange process. Furthermore, in the following explanation, data created based on a plurality of data units (data for which an I/O is performed with respect to a virtual area) will be called "I/O data".

(S1901)

The control processing program 501 selects the data unit migration-source real page and the data unit migration-destination real page. In a case where this rearrange process is the rearrange process in S1804 of FIG. 21, the migration-source real page is selected from the PDEV specified in S1803 of FIG. 21 (the PDEV for which the utilization rate exceeds the predetermined threshold), and the migration-destination real page is selected from the PDEV for which the utilization rate does not exceed the predetermined threshold (for example, the PDEV with the lowest utilization rate) even when the data unit is stored in at least one free real page. Alternatively, in a case where this rearrange process is the rearrange process in S1805 of FIG. 21, the migration-source real page is selected from the PDEV with the highest utilization rate, and the migration-destination real page is selected from the PDEV with the lowest utilization rate.

(S1902)

The control processing program 501 determines whether or not the RAID is supported. "Whether or not the RAID is supported" refers to whether or not it is possible to create I/O data on the basis of RAID technology. Specifically, it refers to whether or not a different data unit, which will become the basis for I/O data created based on a data unit stored in the migration-source real page, exists in a different real page inside the PDEV comprising the migration-destination real page. More specifically, for example, the control processing program 501 determines whether or not the number of the PDEV comprising the migration-destination real page is included in the real page identification information 252 corresponding to the virtual page that is the allocation destination of the migration-source real page, and determines whether the RAID is supported. In a case where the result of this determination is affirmative, S1903 is carried out, and in a case where the result of this determination is negative, S1904 is carried out.

(S1903)

The control processing program 501 migrates the data unit from the migration-source real page to the migration-destination real page. Then, the control processing program 501 updates the identification information of the migration-source real page (the combination of the PDEV number and the real page number), which is included in the real page identification information 252 corresponding to the virtual page that was the allocation destination of the migration-source real page, to the identification information of the migration-destination real page. That is, the control processing program 501 allocates the migration-destination real page to the virtual page in place of the migration-source real page.

(S1904)

The control processing program 501 selects the migration-destination real page from another PDEV. For example, the other PDEV may be a PDEV of which the usage ratio is in a level next lower than the PDEV having the migration-destination selected in S1901, regardless of whether the rearrange process in FIG. 21 is in S1804 or S1805. Further, in this rearrange process, the PDEV may be selected based on not the utilization rates of the PDEV but free capacity of the PDEV.

Figure 23:
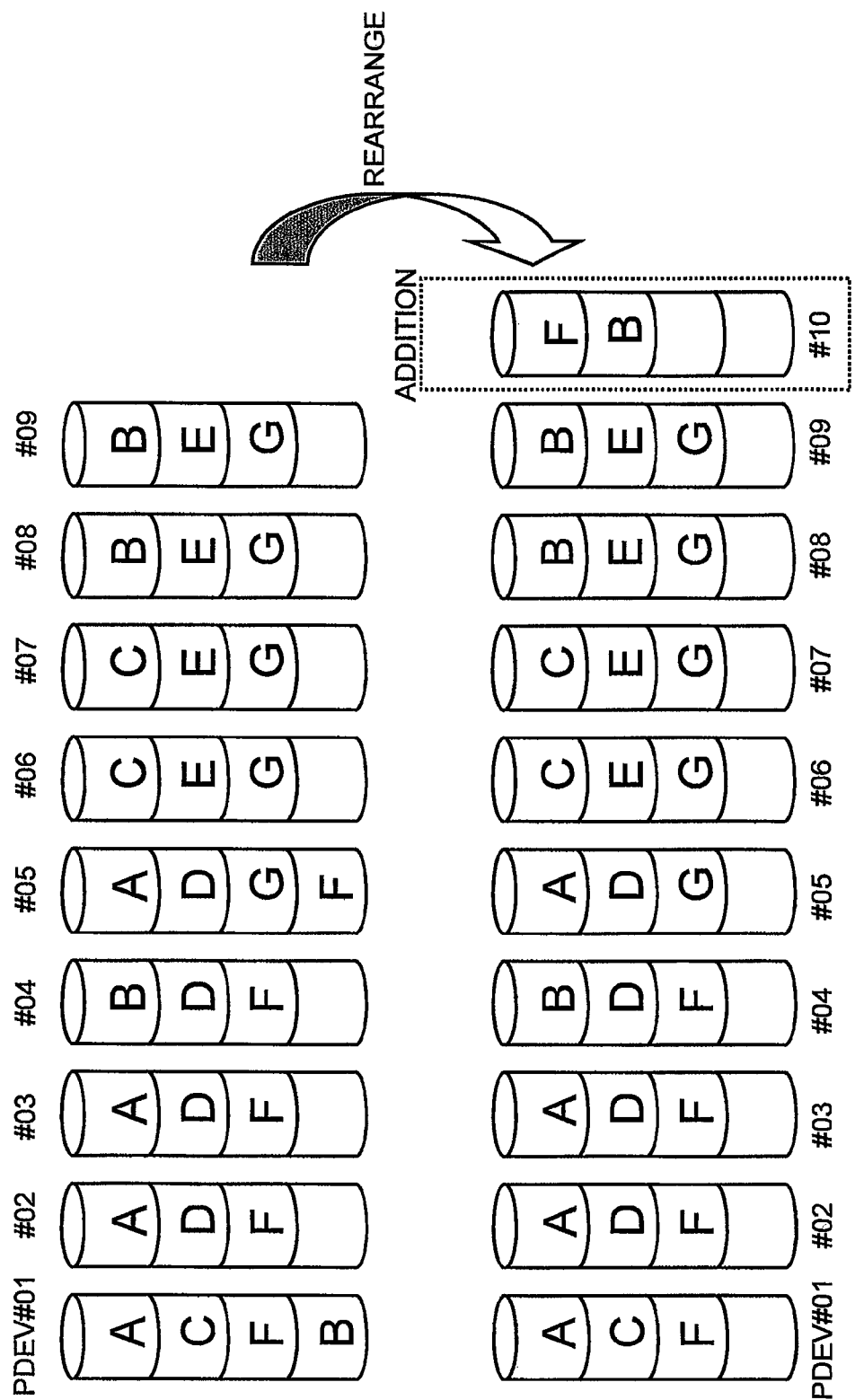
FIG. 23 shows an example of rearranging carried out in a case where a PDEV has been added.

The preceding is an explanation of the processing carried out when a PDEV is added. According to S1805 of FIG. 21, for example, a data unit is migrated as shown in FIG. 23. For example, it is supposed that in the PDEV #01 through #09 that belong to a single DP pool, PDEV #01 and #05 store four data units, and the remaining PDEV #02 through #04 and #06 through #09 store three data units. In a case where the added PDEV #10 is assigned to the DP pool here, one data unit each is migrated from the PDEV #01 and #05 to the added PDEV #10. In accordance with this, the utilization rate of the PDEV #01 through #10 becomes as uniform as possible.

The process related to adding a PDEV is not limited to the explanation given above, and variations such as those described below are conceivable. In this process, a PDEV may be selected based on not the utilization rates of the PDEV but free capacity of the PDEV.

(First Variation)

S1803 through S1805 are not carried out. In this variation, the control processing program 501 always selects the real page, which is to be allocated to a write-destination virtual page, from the added PDEV in the processing of each write command. For example, in a case where PDEV #51 through #53 are in DP pool #20 and PDEV #54 is added to this DP pool #20, the control processing program 501, in the processing of a write command, always does so such that the two or more real pages to be allocated to the write-destination virtual page comprise real pages inside the PDEV #54. Furthermore, at all times the selection of a real page from the added PDEV in the processing of a write command is carried out until the utilization rate of the added PDEV is about the same as the utilization rates of the other PDEV inside the DP pool that includes the added PDEV (for example, either the same as the average of the utilization rates of the PDEV in the DP pool, or a difference with this average of less than a predetermined value). Thereafter, the plurality of PDEV in the DP pool are selected equably.

(Second Variation)

The migration-destination real page is determined based on the access frequency of the migration-source real page (the access frequency specified from the real access status table 515). For example, in a case where the I/O performance of the PDEV comprising the migration-source real page is high compared to the access frequency of the migration-source real page, the migration-destination real page may be selected from the PDEV (for example, a HDD) with a lower I/O performance than the PDEV (for example, a SSD) that comprises the migration-source real page. By contrast, for example, in a case where the I/O performance of the PDEV comprising the migration-source real page is low compared to the access frequency of the migration-source real page, the migration-destination real page may be selected from the PDEV (for example, a SSD) with a higher I/O performance than the PDEV (for example, a HDD) that comprises the migration-source real page.

Figure 24:
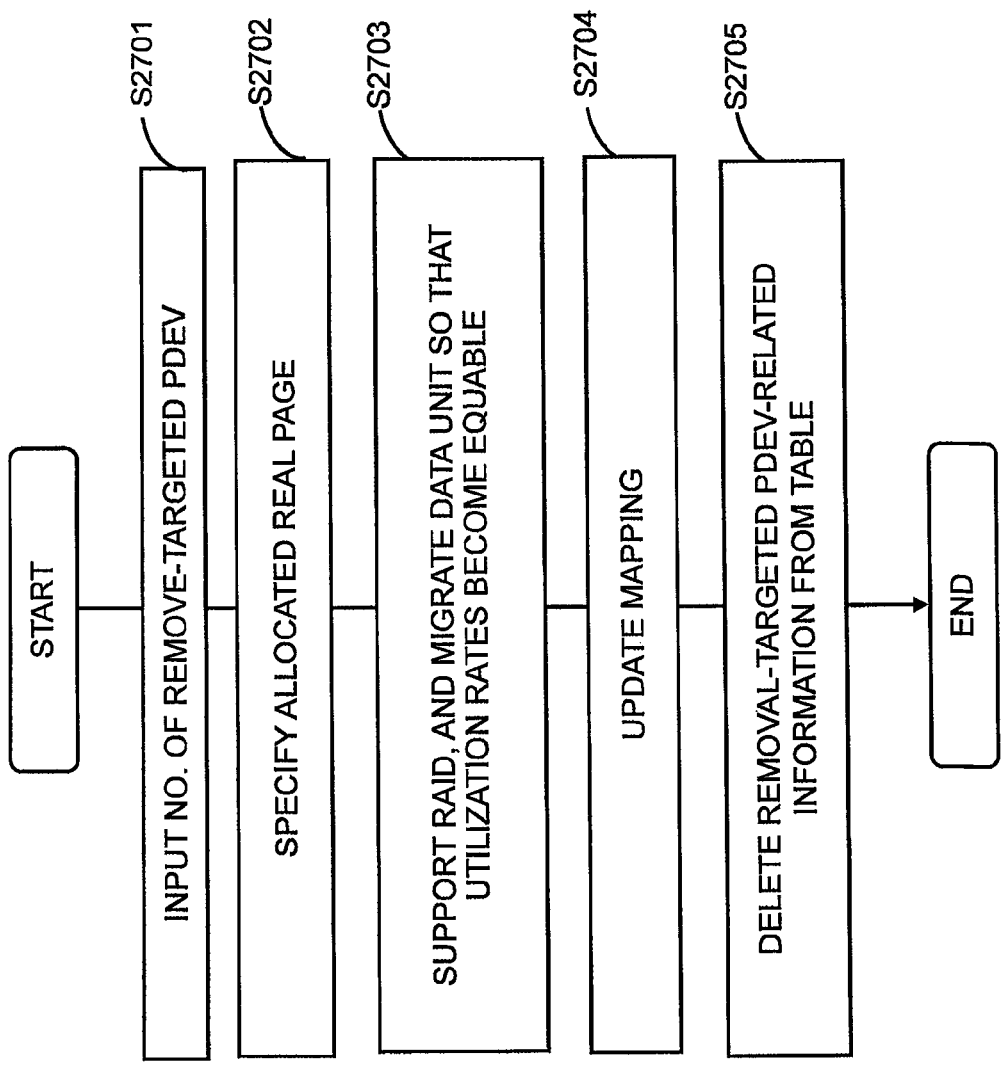
FIG. 24 is a flowchart of processing carried out when removing a PDEV.

FIG. 24 is a flowchart of the processing carried out when a PDEV is removed.

(S2701)

The control processing program 501 receives the input of the number of the PDEV targeted for removal from the user via the management apparatus 105.

(S2702)

The control processing program 501 references the real page management table 511, and specifies one or more real pages, which are respectively allocated to one or more virtual pages from among the plurality of real pages of the PDEV targeted for removal, from the real page for which LUN 242 and the virtual page No. 243 are not "null".

(S2703)

The control processing program 501 supports the RAID, and, in addition, migrates data units so that the utilization rates are equable. Specifically, for example, the control processing program 501 selects one real page (the migration-destination real page) from the PDEV with the lowest utilization rate of the PDEV other than the PDEV targeted for removal for each real page (migration-source real page) that was specified in S2702, and migrates a data unit from the migration-source real page to the selected migration-destination real page. It is preferable that the I/O performance of the PDEV comprising the migration-source real page be the same as the I/O performance of the PDEV comprising the migration-destination real page.

(S2704)

The control processing program 501 allocates to the virtual page, to which the migration-source real page is allocated, the migration-destination real page in place of the migration-source real page for each real page (migration-source real page) specified in S2702. Specifically, for example, the control processing program 501 updates the identification information of the migration-source real page to the migration-destination real page identification information in the real page identification information 252 corresponding to the virtual page to which the migration-source real page is allocated for each real page (migration-source real page) specified in S2702.

(S2705)

The control processing program 501 deletes the information related to the PDEV targeted for removal from the table stored in the memory 123. Specifically, for example, the control processing program 501 performs the following processing:

Deletes the record corresponding to the PDEV targeted for removal from the PDEV management table 509;

Deletes the number of the PDEV targeted for removal from the PDEV number list 211 corresponding to the DP pool of the remove-targeted PDEV in the pool management table 505, and, in addition, subtracts the capacity of the remove-targeted PDEV from the real allocation capacity 212; and in a case where the remove-targeted PDEV number is the first PDEV number 214, the value for the first PDEV number 214 is updated to a value for the PDEV number in the level next larger than the remove-targeted PDEV number.

deletes the information (records) corresponding to the respective real pages of the remove-targeted PDEV from the real page management table 511 that corresponds to the DP pool of the remove-targeted PDEV. In this process executed in a case where a PDEV is removed, the PDEV may be selected based on not the utilization rates of the PDEV but free capacity of the PDEV.

Now then, there are times when the access frequency of the specified real page becomes high and the operating rate (load) of the PDEV comprising this real page increases in accordance with the number and types of I/O commands and the I/O destination information received per unit of time by the storage system 103 while the storage system 103 is in operation.

Accordingly, in this embodiment, a rearrange process is carried out based on the real access status table 515 and/or the virtual access status table 517, which are updated in accordance with the processing of an I/O command. For example, the following three examples (EX1) through (EX3) are conceivable with respect to the rearrange process.

Figure 25:
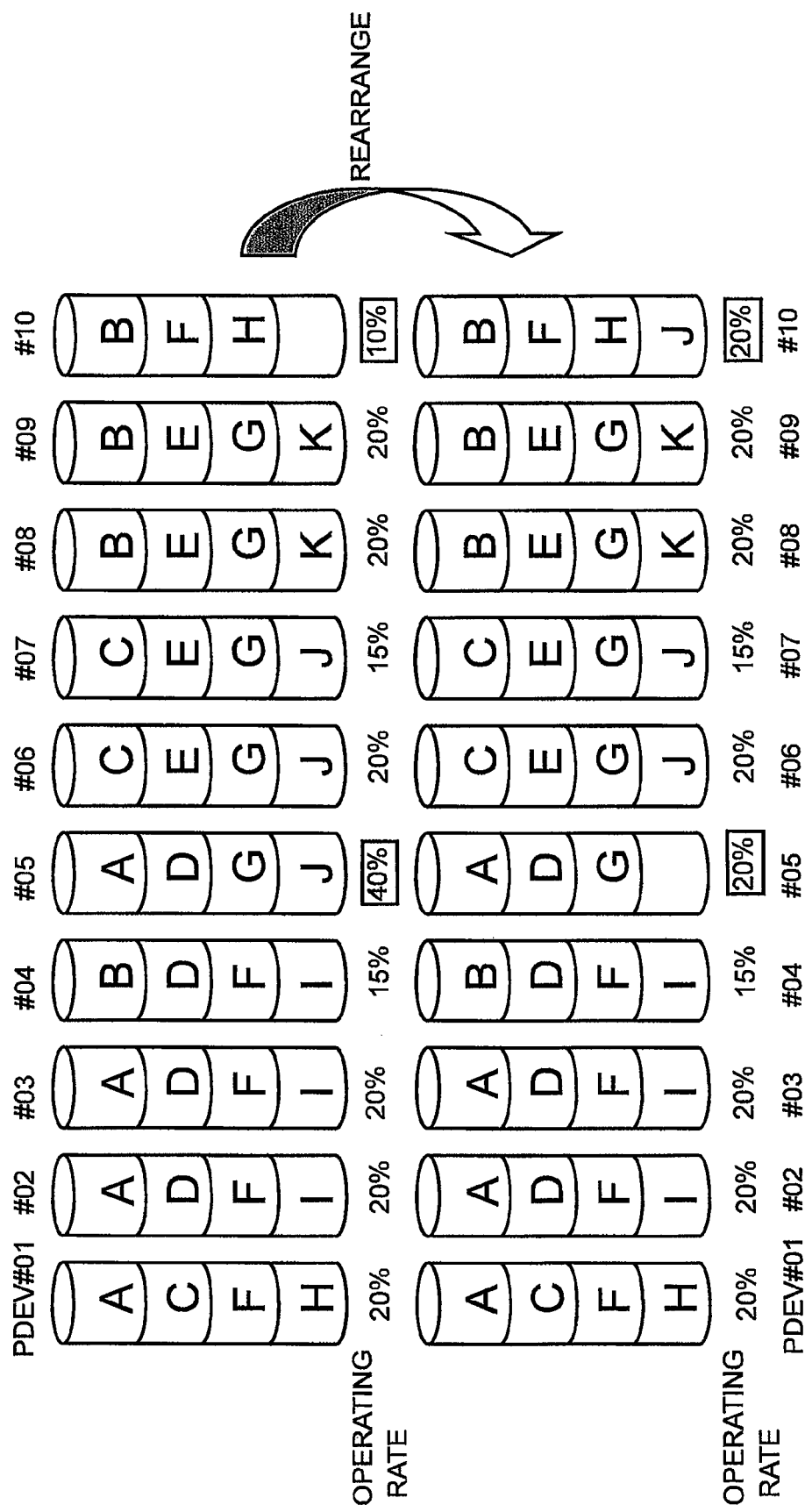
FIG. 25 shows an example of rearranging based on access frequency.

(EX1) The control processing program 501 references the real access status table 515 and/or the virtual access status table 517, and determines whether or not there is a PDEV (hereinafter, high-load PDEV) for which the access frequency or operating rate exceeds a first threshold. The PDEV access frequency, for example, is the average access frequency of the real pages of the PDEV. In a case where a high-load PDEV is specified, the control processing program 501 migrates a data unit inside the high-load PDEV to a free real page inside the PDEV with the lowest operating rate. The real page storing the migration-targeted data unit is either the real page that is allocated to the virtual page with the highest access frequency or the real page with the highest access frequency. According to the example of FIG. 25, the data unit "J" inside the high-load PDEV #05 is migrated to the PDEV #10 with the lowest operating rate. As a result of this, the operating rate of the high-load PDEV #05 is lowered from 40% to 20%, while the operating rate of the PDEV #10 is raised from 10% to 20%. It is preferable that the migration of the data unit be carried out such that the operating rates of a plurality of PDEV become uniform.

(EX2) The control processing program 501 references the real access status table 515 and/or the virtual access status table 517, and determines whether or not there is a PDEV (hereinafter, low-load PDEV) for which the access frequency or operating rate falls below a second threshold (the second threshold<the first threshold). In a case where a low-load PDEV is specified, the control processing program 501 migrates a data unit inside the PDEV with the highest operating rate to a free real page inside the low-load PDEV. The real page storing the migration-targeted data unit is either the real page that is allocated to the virtual page with the highest access frequency or the real page with the highest access frequency.

(EX3) The control processing program 501 references the real access status table 515 and/or the virtual access status table 517, and computes the read ratio and the write ratio for either each real page or each virtual page. The read ratio and the write ratio are the ratios of reads and writes to overall accesses. Specifically, for example, the read ratio and the write ratio may be computed on the basis of the read frequency and the write frequency, and the total of the read frequency and the write frequency. The control processing program 501, in a case where the condition of either (X1) or (X2) below is met, migrates a data unit inside the real page comprising either the computed read ratio or the computed write ratio to a real page comprising an attribute (for example, I/O performance) that is suitable for either the computed read ratio or the computed write ratio.

(X1) Either the computed read ratio or the computed write ratio does not conform to the attribute (for example, the I/O performance) of the PDEV providing the real page that comprises either this read ratio or this write ratio.

(X2) Either the computed read ratio or the computed write ratio does not conform to the attribute (for example, the I/O performance) of the PDEV providing the real page that is allocated to the virtual page that comprises either this read ratio or this write ratio.

There are times when the assigned destination of the virtual LU is switched from a first DP pool to a second DP pool. In accordance with this, the following (f1) and (f2) processes are carried out for each virtual page to which a real page inside the first DP pool is allocated:

(f1) Data units are respectively migrated from the plurality of real pages inside the first DP pool, which are allocated to the virtual page, to the plurality of real pages inside the second DP pool; and (f2) the plurality of migration-destination real pages are allocated to the virtual page in place of the plurality of migration-source real pages. Furthermore, the migration-destination real pages in (f1) are selected from the PDEV that comprises the attribute (for example, I/O performance) that conforms to the access frequency of the virtual page (the access frequency specified from the virtual access status table 517). For example, in a case where the access frequency of the virtual page is greater than a predetermined threshold, the migration-destination real page may be selected from the PDEV with high I/O performance, and alternatively, in a case where the access frequency of the virtual page is lower than the predetermined threshold, the migration-destination real page may be selected from the PDEV with low I/O performance.

Figure 26:
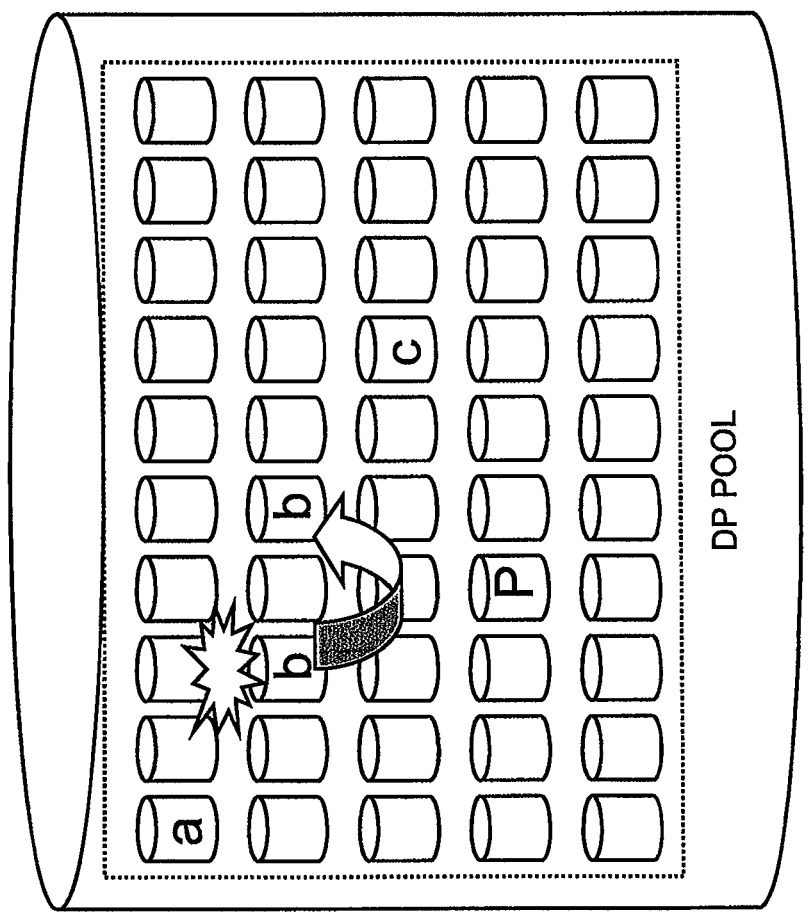
FIG. 26 shows an overview of a restore process in the case of a failure in a PDEV.

As described hereinabove, in this embodiment, the real page of the DP pool is provided from the PDEV rather than from the RAID group. For this reason, in a case where a failure occurs in the PDEV, a data unit restore need only be carried out for the real page allocated to the virtual page from among the plurality of real pages of the PDEV in which the failure occurred (hereinafter, the failed PDEV). Here, the expression "restore" means the restoration of data stored in the real page in the failed PDEV from the data elements or parity written in the real pages other than the real page in the failed PDEV from among real pages assigned with the same real page. Specifically, for example, in a case where only data element "b" is stored in the failed PDEV as shown in FIG. 26, the control processing program 501 restores the data element "b" on the basis of the other data elements "a" and "c" and the parity "P", and writes the restored data element "b" to a PDEV in which a failure has not occurred. The PDEV that becomes the write destination is selected such that the utilization rates (or free capacity) in the DP pool are equable.

As processes related to a data unit restore inside a failed PDEV, there may be a priority-restore type restore process and a priority-replace type restore process.

The priority-restore type restore process, for example, is as follows. That is, the control processing program 501 restores data units inside one or more real pages allocated to one or more virtual pages within the failed PDEV, and distributes the restored one or more data units to one or more other PDEV. After the failed PDEV has been replaced with another PDEV, the control processing program 501 migrates the data units from the plurality of other PDEV to the post-replace PDEV by carrying out a rearrange process such that the utilization rates of the plurality of PDEV are uniform.

The priority-replace type restore process, for example, is as follows. That is, the failed PDEV is replaced with another PDEV. The control processing program 501 restores data units inside one or more real pages allocated to one or more virtual pages within the failed PDEV, and writes the restored one or more data units to the post-replace PDEV.

These respective restore processes will be explained in detail below.

Figure 27:
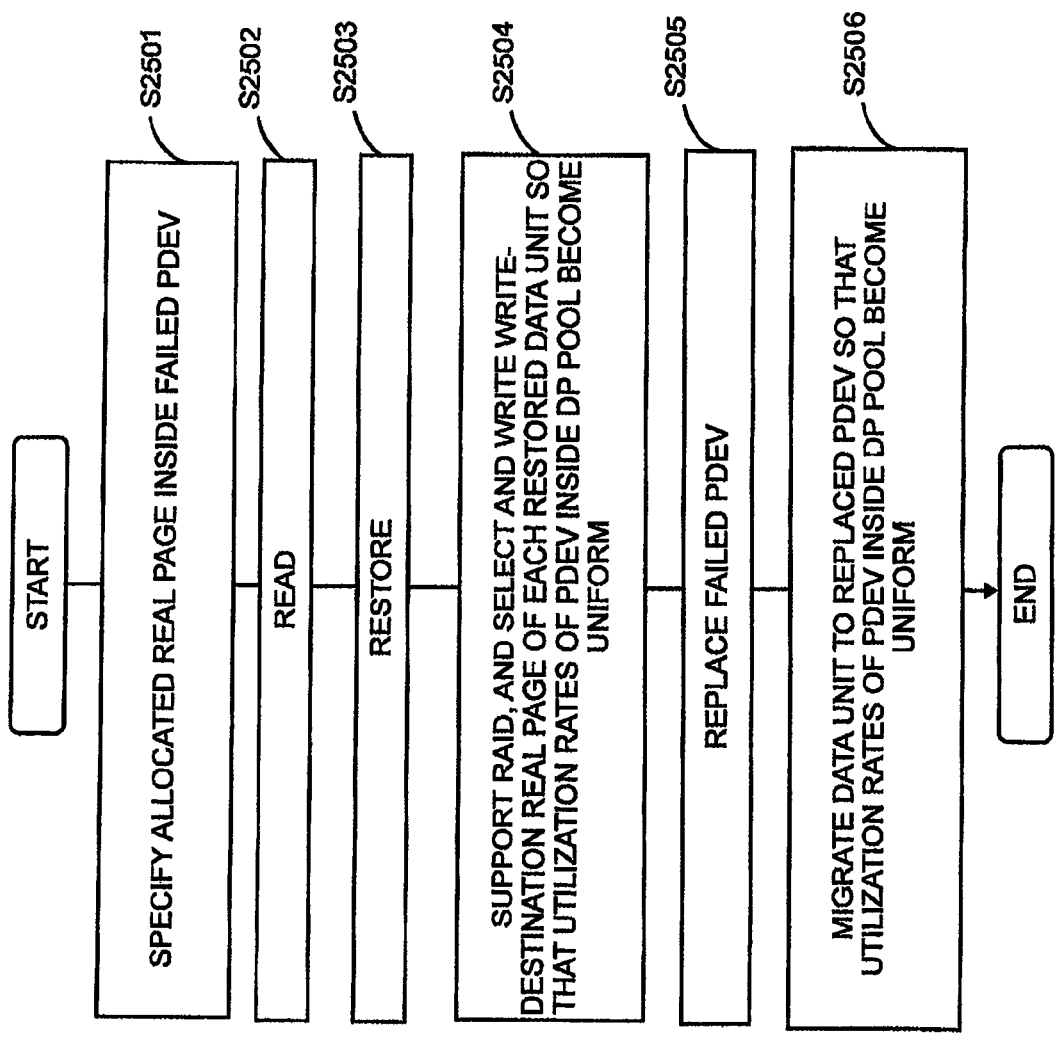
FIG. 27 is a flowchart of a priority-restore type restore process.

FIG. 27 is a flowchart of the priority-restore type restore process.

(S2501)

The control processing program 501 references the mapping management table 513 and specifies an allocated real page within the failed PDEV. The control processing program 501 carries out (S2502) through (S2504) below for each allocated real page that is specified.

(S2502)

The control processing program 501 reads a data unit from one or more other real pages allocated to the allocation-destination virtual page of the allocated real pages.

(S2503)

The control processing program 501 restores the data unit to be stored in the real page inside the failed PDEV based on the one or more data units read in S2502.

(S2504)

The control processing program 501 supports the RAID, and, in addition, selects a free real page as the write-destination for the data unit restored in S2503 from another PDEV inside the DP pool such that the utilization rates of the PDEV inside this DP pool of the failed PDEV are uniform, and writes the restored data unit to the selected real page. The control processing program 501 allocates this write-destination real page to the virtual page in place of the real page inside the failed PDEV.

(S2505)

After carrying out S2502 through S2504 for all of the allocated real pages in the failed PDEV, the failed HDD is replaced with another HDD.

(S2506)

The control processing program 501 migrates the data unit from the plurality of other PDEV inside the DP pool to the post-replace PDEV such that the utilization rates of the PDEV inside the DP pool are uniform. The control processing program 501 allocates the migration-destination real page inside the post-replace PDEV to the virtual page in place of the data unit migration-source real page. In the priority-replace type restore process, a migration-destination PDEV may be selected so that not the utilization rates of the PDEV but free capacity of the PDEV become uniform.

The following is conceivable as a variation of this restore process. For example, in a case where the control processing program 501 receives a read command from the host 101, and, in addition, detects the fact that a real page inside the failed PDEV is included in the plurality of real pages that are allocated to this read-source virtual page, the control program 510 may carry out S2503 and S2504 on the basis of the one or more data units that were read in response to the read command. After S2503 and S2504 have been carried out for all the allocated real pages in the failed PDEV, S2505 and S2506 may be carried out.

Figure 28:
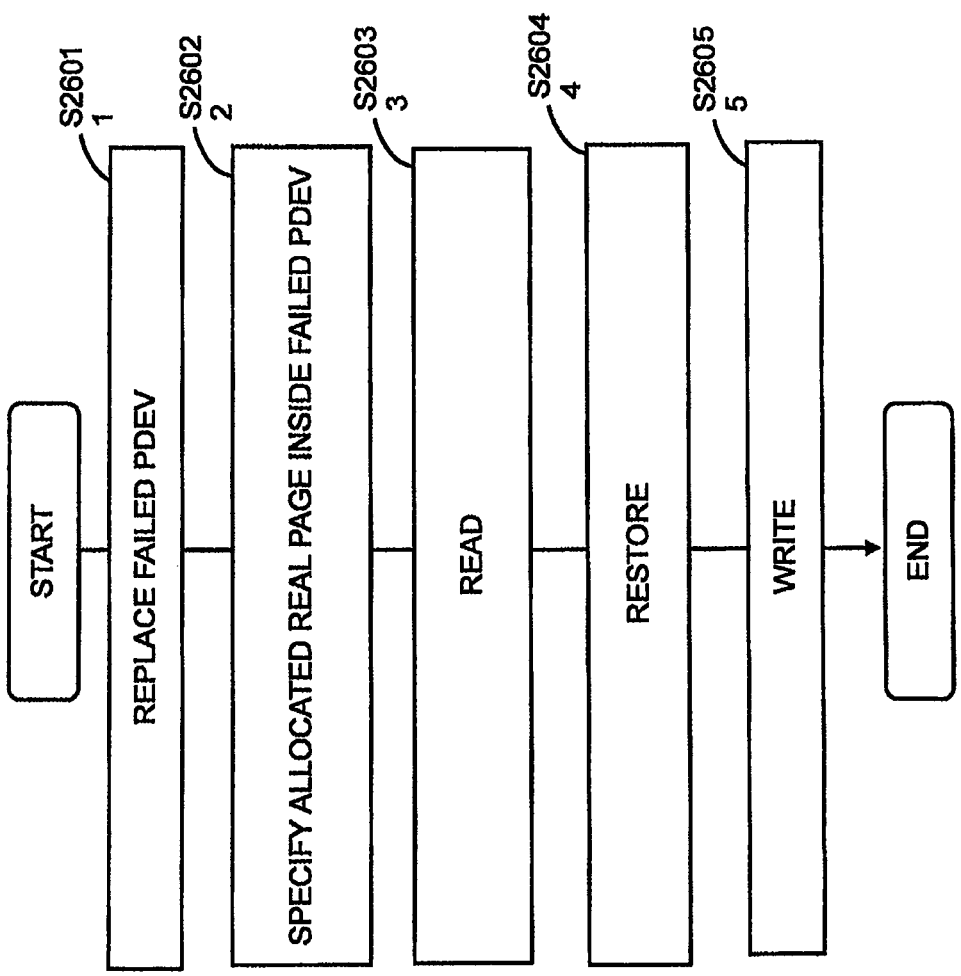
FIG. 28 is a flowchart of a priority-replace type restore process.

FIG. 28 is a flowchart of the priority-replace type restore process.

(S2601)

The failed PDEV is replaced with another PDEV.

(S2602)

The control processing program 501 references the real page management table 511, and specifies an allocated real page within the failed PDEV. The control processing program 501 carries out (S2603) through (S2605) below for each allocated real page that is specified.

(S2603)

The control processing program 501 reads a data unit from one or more other real pages allocated to the virtual page that is the allocation destination of the allocated real page.

(S2604)

The control processing program 501 restores the data unit to be stored in the real page inside of the failed PDEV on the basis of the one or more data units read in S2603.

(S2605)

The control processing program 501 writes the restored data unit to the post-replace PDEV.

The decision to perform a priority-restore or a priority-replace may be made in accordance with the access status with respect to the storage system 103, or may be preset by the user.

The preceding has been an explanation of one embodiment of the present invention, but, needless to say, the present invention is not limited to this embodiment, and a variety of changes are possible without departing from the scope thereof. For example, each element may be identified by another type of identification information either instead of or in addition to a number and a name. Further, for example, the creation of a parity may be carried out by a hardware circuit instead of the control processing program 501. Further, for example, at the least one of the access counter 244 for each real page and the access counter 253 for each virtual page may be at the least one of a write counter and a read counter instead of the access counter. Further, for example, the real access status table 515 may be eliminated. In this case, it is possible to regard the access frequency of the virtual page as the access frequency of the real page corresponding to the virtual page.

REFERENCE SIGNS LIST

103 Storage system

The invention claimed is:

1. A storage system coupled to a host apparatus, the storage system comprising:
a controller; and
a plurality of storage devices including a first type of storage devices and a second type of storage devices, an attribute of the first type of storage devices being different from an attribute of the second type of storage devices,
the controller configured to:
manage at least a pool including a plurality of real pages, each of which is included in one of the plurality of storage devices;
provide a virtual volume to the host apparatus, the virtual volume including a plurality of virtual pages, to each of which a portion of the pool is allocated in accordance with a write command;
distribute data written in a first virtual page to a first group of real pages, the first group of real pages being included in a portion of the pool allocated to the first virtual page, the first group of real pages making up a redundant array and being selected from different storage devices of the first type of storage devices; and
migrate data stored in the first group of real pages to the second type of storage devices so that each real page of the first group belongs to the second type of storage devices according to an access status of the first virtual page.

2. The storage system according to claim 1,
wherein the controller is configured to distribute data written in a second virtual page to a second group of real pages, the second group of real pages being included in a portion of the pool allocated to the second virtual page, the second group of real pages making up a redundant array and being selected from different storage devices of the first type of storage devices;

wherein a performance attribute of the first type of storage devices is higher than a performance attribute of the second type of storage devices, and the access frequency of the first virtual page is higher than an access frequency of the second virtual page, and wherein the controller is configured to not migrate data stored in the second group of real pages when the data stored in the first group of real pages is migrated.

3. The storage system according to claim 1, wherein the controller is configured to:

distribute data written in a second virtual page to a second group of real pages, the second group of real pages being included in portion of the pool allocated to the second virtual page, the second group of real pages making up a redundant array and being selected from different storage devices of the first type of storage devices;

migrate data stored in a first real page, which is a real page of the second group of real pages and belongs to a first storage device of the first type of storage devices, to another storage device of the first type of storage devices when the load of the first storage device is high; and not migrate data stored in another real page of the second group of real pages and data stored in another real page belonging to the first storage device.

4. The storage system according to claim 3, wherein the controller is configured to migrate the data stored in the first real page to another storage device which does not include the real pages of the first group.

5. The storage system according to claim 3, wherein when the load of the first storage device is high, the controller is configured to migrate the data stored in the first real page.

6. The storage system according to claim 1, wherein the first storage device stores data of the second virtual page and data of a third virtual page, and wherein a second storage device stores data of the second virtual page and does not store data of the third virtual page.

7. The storage system according to claim 1, wherein a number of real pages of the first group is predetermined based on a number of data and parity data designated to the virtual volume.

8. A method in a storage system coupled to a host apparatus and having a controller and a plurality of storage devices including a first type of storage devices and a second type of storage devices, an attribute of the first type of storage devices being different from an attribute of the second type of storage devices, the method comprising the steps of:

managing, by the controller, at least a pool including a plurality of real pages, each of which is included in one of the plurality of storage devices;

providing, by the controller, a virtual volume to the host apparatus, the virtual volume including a plurality of virtual pages, to each of which a portion of the pool is allocated in accordance with a write command;

distributing, by the controller, data written in a first virtual page to a first group of real pages, the first group of real pages being included in a portion of the pool allocated to the first virtual page, the first group of real pages making up a redundant array and being selected from different storage devices of the first type of storage devices; and migrating, by the controller, data stored in the first group of real pages to the second type of storage devices so that each real page of the first group belongs to the second type of storage devices according to an access status of the first virtual page.

9. The method according to claim 8, further comprising the steps of:

distributing, by the controller, data written in a second virtual page to a second group of real pages, the second group of real pages being included in a portion of the pool allocated to the second virtual page, the second group of real pages making up a redundant array and being selected from different storage devices of the first type of storage devices, wherein a performance attribute of the first type of storage devices is higher than a performance attribute of the second type of storage devices, and the access frequency of the first virtual page is higher than an access frequency of the second virtual page, and not migrating, by the controller, data stored in the second group of real pages when the data stored in the first group of real pages is migrated.

10. The method according to claim 8, further comprising the steps of:

distributing, by the controller, data written in a second virtual page to a second group of real pages, the second group of real pages being included in portion of the pool allocated to the second virtual page, the second group of real pages making up a redundant array and being selected from different storage devices of the first type of storage devices;

migrating, by the controller, data stored in a first real page, which is a real page of the second group of real pages and belongs to a first storage device of the first type of storage devices, to another storage device of the first type of storage devices when the load of the first storage device is high; and not migrating, by the controller, data stored in another real page of the second group of real pages and data stored in another real page belonging to the first storage device.

11. The method according to claim 10, further comprising the step of:

migrating, by the controller, the data stored in the first real page to another storage device which does not include the real pages of the first group.

12. The method according to claim 10, further comprising the step of:

when the load of the first storage device is high, migrating, by the controller, the data stored in the first real page.

13. The method according to claim 8, further comprising the steps of:

storing, by the first storage device, data of the second virtual page and data of a third virtual page, and storing, by a second storage device, data of the second virtual page and not storing data of the third virtual page.

14. The method according to claim 8, wherein a number of real pages of the first group is predetermined based on a number of data and parity data designated to the virtual volume.

* * * * *